US011552330B2

(12) United States Patent
Mochizuki et al.

(10) Patent No.: US 11,552,330 B2
(45) Date of Patent: Jan. 10, 2023

(54) ELECTRODE SHEET FOR ALL-SOLID STATE SECONDARY BATTERY, ALL-SOLID STATE SECONDARY BATTERY, METHOD OF MANUFACTURING ELECTRODE SHEET FOR ALL-SOLID STATE SECONDARY BATTERY, AND METHOD OF MANUFACTURING ALL-SOLID STATE SECONDARY BATTERY

(71) Applicant: FUJIFILM Corporation, Tokyo (JP)

(72) Inventors: Hiroaki Mochizuki, Kanagawa (JP); Masaomi Makino, Kanagawa (JP); Tomonori Mimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 153 days.

(21) Appl. No.: 16/842,771

(22) Filed: Apr. 8, 2020

(65) Prior Publication Data

US 2020/0235424 A1 Jul. 23, 2020

Related U.S. Application Data

(63) Continuation of application No. PCT/JP2018/037996, filed on Oct. 11, 2018.

(30) Foreign Application Priority Data

Oct. 12, 2017 (JP) ............................ JP2017-198508

(51) Int. Cl.
*H01M 4/139* (2010.01)
*H01M 10/0562* (2010.01)
(Continued)

(52) U.S. Cl.
CPC ..... *H01M 10/0562* (2013.01); *H01M 4/0404* (2013.01); *H01M 4/139* (2013.01);
(Continued)

(58) Field of Classification Search
CPC .... H01M 4/621; H01M 4/139; H01M 4/0404; H01M 10/0562
See application file for complete search history.

(56) References Cited

U.S. PATENT DOCUMENTS 10,396,362 B2 8/2019 Yoon et al.
10,756,352 B2 8/2020 Yoon et al.
(Continued)

FOREIGN PATENT DOCUMENTS

JP 2013125707 6/2013
JP 2017135094 8/2017
(Continued)

OTHER PUBLICATIONS

"Office Action of Japan Counterpart Application", dated Mar. 16, 2021, with English translation thereof, pp. 1-4.
(Continued)

*Primary Examiner* — James Lee
(74) *Attorney, Agent, or Firm* — JCIPRNET

(57) ABSTRACT

Provided are an electrode sheet for an all-solid state secondary battery, an all-solid state secondary battery, a method of manufacturing an electrode sheet for an all-solid state secondary battery, and a method of manufacturing an all-solid state secondary battery. The electrode sheet for an all-solid state secondary battery includes a current collector, a primer layer, and an electrode active material layer in this order, in which the primer layer includes a binder (A), the electrode active material layer includes an inorganic solid electrolyte (B), an active material (C), and binder particles (D) having an average particle size of 1 nm to 10 μm and further includes the binder (A) on at least an adhesive interface side with the primer layer, and (Continued)

a crosslinked structure is not formed between the binder (A) and the inorganic solid electrolyte (B).

12 Claims, 1 Drawing Sheet

(51) Int. Cl.

| | |
|---|---|
| ***H01M 4/04*** | (2006.01) |
| ***H01M 4/36*** | (2006.01) |
| ***H01M 4/62*** | (2006.01) |
| ***H01M 10/052*** | (2010.01) |
| ***H01M 10/0585*** | (2010.01) |

(52) U.S. Cl.

CPC ............. *H01M 4/36* (2013.01); *H01M 4/621* (2013.01); *H01M 10/052* (2013.01); *H01M 10/0585* (2013.01); *H01M 2300/0068* (2013.01)

(56) References Cited

U.S. PATENT DOCUMENTS

| | | | |
|---|---|---|---|
| 2013/0157143 A1 | 6/2013 | Hoshiba et al. | |
| 2014/0127579 A1 | 5/2014 | Yoshida et al. | |
| 2015/0086875 A1 | 3/2015 | Yoshida | |
| 2016/0365604 A1* | 12/2016 | Mimura ............ | H01M 10/0562 |
| 2017/0301949 A1 | 10/2017 | Mimura et al. | |
| 2018/0226681 A1* | 8/2018 | Hasegawa ........... | H01M 10/052 |

FOREIGN PATENT DOCUMENTS

| | | |
|---|---|---|
| WO | 2012173089 | 12/2012 |
| WO | 2012176267 | 12/2012 |
| WO | 2013146916 | 10/2013 |
| WO | 2016129426 | 8/2016 |

OTHER PUBLICATIONS

"International Search Report (Form PCT/ISA/210)" of PCT/JP2018/037996, dated Jan. 15, 2019, with English translation thereof, pp. 1-4.

"Written Opinion of the International Searching Authority (Form PCT/ISA/237)" of PCT/JP2018/037996, dated Jan. 15, 2019, with English translation thereof, pp. 1-12.

"Office Action of China Counterpart Application" with English translation thereof, dated Sep. 6, 2022, p. 1-p. 15.

* cited by examiner

ELECTRODE SHEET FOR ALL-SOLID STATE SECONDARY BATTERY, ALL-SOLID STATE SECONDARY BATTERY, METHOD OF MANUFACTURING ELECTRODE SHEET FOR ALL-SOLID STATE SECONDARY BATTERY, AND METHOD OF MANUFACTURING ALL-SOLID STATE SECONDARY BATTERY

CROSS-REFERENCE TO RELATED APPLICATIONS

This application is a Continuation of PCT International Application No. PCT/JP2018/037996 filed on Oct. 11, 2018, which claims priority under 35 U.S.C. § 119 (a) to Japanese Patent Application No. 2017-198508 filed in Japan on Oct. 12, 2017. Each of the above applications is hereby expressly incorporated by reference, in its entirety, into the present application.

BACKGROUND OF THE INVENTION

1. Field of the Invention

The present invention relates to an electrode sheet for an all-solid state secondary battery, an all-solid state secondary battery, a method of manufacturing an electrode sheet for an all-solid state secondary battery, and a method of manufacturing an all-solid state secondary battery.

2. Description of the Related Art

A lithium ion secondary battery is a storage battery which has a negative electrode, a positive electrode, and an electrolyte sandwiched between the negative electrode and the positive electrode and enables charging and discharging by the reciprocal migration of lithium ions between both electrodes. In the related art, in lithium ion secondary batteries, an organic electrolytic solution has been used as the electrolyte. However, in organic electrolytic solutions, liquid leakage is likely to occur, there is a concern that a short circuit and ignition may be caused in batteries due to overcharging or overdischarging, and there is a demand for additional improvement in reliability and safety.

Under these circumstances, all-solid state secondary batteries in which an inorganic solid electrolyte is used instead of the organic electrolytic solution are attracting attention. In all-solid state secondary batteries, all of the negative electrode, the electrolyte, and the positive electrode are solid, safety or reliability which is considered as a problem of batteries in which the organic electrolytic solution is used can be significantly improved, and it also becomes possible to extend the service lives. Further, an all-solid state secondary battery may have a structure in which electrodes and an electrolyte are directly disposed in series. Therefore, the energy density can be further increased as compared to a secondary battery in which an organic electrolytic solution is used, and the application to an electric vehicle or a large-sized storage battery is expected.

Due to the above-described advantageous effects, all-solid state secondary batteries have been developed as the next-generation lithium ion batteries. For example, WO2013/146916A describes an electrode for an all-solid state secondary battery having a structure in which a current collector and an electrode mixture layer are laminated through a conductive adhesive layer (primer layer), the electrode mixture layer including an inorganic solid electrolyte having a sulfur atom and an active material, the conductive adhesive layer (primer layer) including a diene polymer and conductive particles, and the diene polymer including a specific mass of a diene monomer unit. In the electrode for an all-solid state secondary battery, the sulfur atom included in the inorganic solid electrolyte and a carbon-carbon double bond of the diene polymer form a crosslinked structure such that the peel strength (binding properties between the current collector and the electrode mixture layer) is excellent, and an all-solid state secondary battery including the electrode for an all-solid state secondary battery has excellent high temperature cycle characteristics. In addition, WO2016/129426A describes an electrode sheet for an all-solid state secondary battery including an inorganic solid electrolyte, an active material, and an electrode active material layer that includes a polymer having a specific functional group. The electrode sheet for an all-solid state secondary battery has excellent binding properties, and an all-solid state secondary battery including the electrode sheet for an all-solid state secondary battery has excellent ion conductivity.

SUMMARY OF THE INVENTION

As described above, in the electrode for an all-solid state secondary battery described in WO2013/146916A, in order to improve the peel strength, a crosslinked structure is formed between a diene copolymer included in the conductive adhesive layer and the inorganic solid electrolyte included in the electrode mixture layer (electrode active material layer). However, this crosslinked structure has high binding properties but is not likely to maintain sufficient flexibility. That is, in a case where the electrode for an all-solid state secondary battery described in WO2013/146916A is bent, cracking and/or fracturing is likely to occur in the electrode active material layer. In addition, according to an investigation by the present inventors, the peel strength cannot be made sufficiently high even with the technique described in WO2013/146916A, and it has been also found that further improvement of binding properties between the current collector and the electrode active material layer are required for practical use.

An object of the present invention is to provide an electrode sheet for an all-solid state secondary battery that has excellent binding properties between a current collector and an electrode active material layer and can realize excellent flexibility. By using this electrode sheet for an all-solid state secondary battery as an electrode for al all-solid state secondary battery, an all-solid state secondary battery having a high discharge capacity density and suppressing an increase in resistance can be obtained. In addition, another object of the present invention is to provide an all-solid state secondary battery that is obtained using the above-described electrode sheet for an all-solid state secondary battery. Still another object of the present invention is to provide a method of manufacturing the above-described electrode sheet for an all-solid state secondary battery and a method of manufacturing the above-described all-solid state secondary battery.

As a result of thorough investigation by the present inventors, it was found that, during the preparation of an electrode sheet for an all-solid state secondary battery in which a current collector and an electrode active material layer are laminated with a primer layer interposed therebetween, binding properties (peel strength) between the current collector and the electrode active material layer can be effectively improved and sufficiently high electrode flexibility can be imparted with a configuration in which the electrode active material layer includes a binder forming the primer layer on at least an adhesive interface side (the adhesive interface and the vicinity thereof) with the primer layer and the electrode active material layer includes binder particles. In addition, it was also found that, in a case where the electrode sheet for an all-solid state secondary battery is used as an electrode for an all-solid state secondary battery, the discharge capacity density of the obtained all-solid state secondary battery can be increased, and an increase in resistance caused by a binder in the primer layer or the electrode active material layer can also be suppressed. The present invention has been completed based on the above findings as a result of repeated investigation.

That is, the above-described objects have been achieved by the following means.

<1> An electrode sheet for an all-solid state secondary battery comprising a current collector, a primer layer, and an electrode active material layer in this order, in which the primer layer includes a binder (A), the electrode active material layer includes an inorganic solid electrolyte (B) having ion conductivity of a metal belonging to Group 1 or Group 2 in the periodic table, an active material (C), and binder particles (D) having an average particle size of 1 nm to 10 μm and further includes the binder (A) on at least an adhesive interface side with the primer layer, and a crosslinked structure is not formed between the binder (A) and the inorganic solid electrolyte (B).

<2> The electrode sheet for an all-solid state secondary battery according to <1>, in which a ratio Bet mass % of a content of the binder (A) in an electrode active material layer ET to a total content of the binder (A) and the binder particles (D) in the electrode active material layer ET and a ratio Bes mass % of a content of the binder (A) in an electrode active material layer ES to a total content of the binder (A) and the binder particles (D) in the electrode active material layer ES satisfy Bet/Bes>1, where in a case where the electrode active material layer is equally divided into ten sub layers in a thickness direction and the ten sub layers are represented by a to j layers, respectively, in order from a sub layer in contact with the primer layer, the electrode active material layer ET represents the a layer and the electrode active material layer ES represents a layer including the b to j layers.

<3> The electrode sheet for an all-solid state secondary battery according to <1> or <2>, wherein an electrode active material layer ETO does not include the binder (A), where in a case where the electrode active material layer is equally divided into ten sub layers in a thickness direction and the ten sub layers are represented by a to j layers, respectively, in order from a sub layer in contact with the primer layer, the electrode active material layer ETO represents the j layer.

<4> The electrode sheet for an all-solid state secondary battery according to any one of <1> to <3>, wherein a content of the binder (A) decreases from the current collector side of the electrode active material layer toward a side of the electrode active material layer opposite to the current collector.

<5> The electrode sheet for an all-solid state secondary battery according to any one of <1> to <4>, wherein a Log P value of a dispersion medium that disperses the binder particles (D) and a Log P value of a solvent that dissolves the binder (A) are 0.5 or higher.

<6> The electrode sheet for an all-solid state secondary battery according to any one of <1> to <5>, in which the binder particles (D) are polyamide particles, polyimide particles, polyurea particles, fluorine-containing resin particles, hydrocarbon resin particles, urethane resin particles, or acrylic resin particles.

<7> The electrode sheet for an all-solid state secondary battery according to any one of <1> to <6>, wherein a compound forming the binder (A) is different from a compound forming the binder particles (D).

<8> The electrode sheet for an all-solid state secondary battery according to any one of <1> to <7>, in which the binder (A) is a hydrocarbon resin.

<9> The electrode sheet for an all-solid state secondary battery according to any one of <1> to <8>, in which the binder particles (D) have at least one in the following group of functional groups, <Group of Functional Groups> an acidic functional group, a basic functional group, a hydroxy group, a cyano group, an alkoxysilyl group, an aryl group, a heteroaryl group, and a hydrocarbon ring group in which three or more rings are fused.

<10> The electrode sheet for an all-solid state secondary battery according to any one of <1> to <9>, in which the inorganic solid electrolyte (B) is a sulfide-based inorganic solid electrolyte.

<11> The electrode sheet for an all-solid state secondary battery according to any one of <1> to <10>, in which in a case where the electrode active material layer is peeled off from the current collector, a peel strength is 60 N/m or higher.

<12> An all-solid state secondary battery comprising the electrode sheet for an all-solid state secondary battery according to any one of <1> to <11>.

<13> A method of manufacturing the electrode sheet for an all-solid state secondary battery according to any one of claims 1 to 11, the method comprising:

a step of forming the primer layer on the current collector and forming the electrode active material layer on the primer layer, wherein by transferring a part of the binder (A) in the primer layer to the electrode active material layer in the step, the electrode active material layer includes the binder (A) on at least an adhesive interface side with the primer layer.

<14> A method of manufacturing an all-solid state secondary battery, the method comprising:

obtaining an electrode sheet for an all-solid state secondary battery using the method according to <13> and manufacturing an all-solid state secondary battery using the electrode sheet for an all-solid state secondary battery.

In the description of the present invention, "a crosslinked structure is not formed between the binder (A) and the inorganic solid electrolyte (B))" represents that a residual ratio of the binder (A) calculated by Expression (A) below is lower than 10%.

Using an ion milling device (trade name: "IM4000PLUS", manufactured by Hitachi High-Technologies Corporation), a cross-section of the electrode sheet for an all-solid state secondary battery or t the all-solid state secondary battery is exposed, and the total area of a cross-section of the binder (A) in a cross-section (cross-section including the sub layer a described below) of the electrode active material layer is calculated by Raman mapping. After the determination, the cross-section of the electrode active material layer was washed with a solvent that dissolves the binder (A). After washing, the total area of the cross-section of the binder (A) in the cross-section of the electrode active material layer was calculated by Raman mapping. Using the following Expression (A), a ratio of a change in the total area of the cross-section of the binder (A) before and after washing is calculated.

(Total Area of Cross-section of Binder(A) in Cross-section after Washing)/(Total Area of Cross-section of Binder(A) in Cross-section before Washing)×100 Expression (A)

(Cross-Section Exposure Condition by Ion Milling Device)

Using an ion milling device (trade name: "IM4000PLUS", manufactured by Hitachi High-Technologies Corporation), the cross-section is exposed under a condition of acceleration voltage: 3 kV.

(Condition of Raman Mapping)

Cross-sections of five positions are exposed, and the total average value of the areas of cross-sections of the binder (A) in the respective cross-sections are obtained as "Total Area of Cross-section" in Expression (A). The total area of cross-sections of the binder (A) in the respective cross-sections were calculated from a spectrum derived from the binder (A) by observation of the cross-sections using a microscopic Raman spectrometer (manufactured by JEOL Ltd.).

In the description of the present invention, numerical ranges represented by "to" include numerical values before and after "to" as lower limit values and upper limit values.

In the description of the present invention, "(meth)acryl" refers to at least one of methacryl or acryl. In the description of the present invention, "(meth)acryloyl" refers to at least one of methacryloyl or acryloyl.

The electrode sheet for an all-solid state secondary battery according to the present invention has excellent peel strength and electrode flexibility, and by using electrode sheet for an all-solid state secondary battery according to the present invention as an electrode for an all-solid state secondary battery, an all-solid state secondary battery having a high discharge capacity density and suppressing an increase in resistance can be obtained. The all-solid state secondary battery according to the present invention has a high discharge capacity density and can realize a sufficiently low resistance. Further with the method of manufacturing an electrode sheet for an all-solid state secondary battery and the method of manufacturing an all-solid state secondary battery according to the present invention, an electrode sheet for an all-solid state secondary battery and an all-solid state secondary battery having the above-described excellent properties can be manufactured.

DESCRIPTION OF THE PREFERRED EMBODIMENTS

Figure 1:
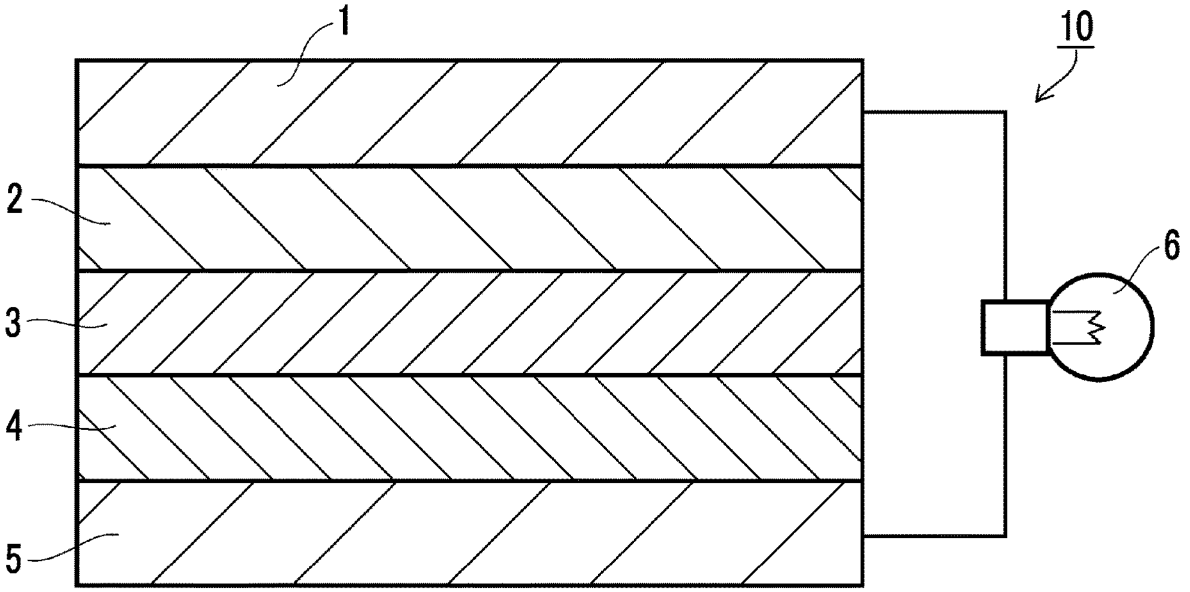
FIG. 1 is a vertical cross-sectional view schematically illustrating an all-solid state secondary battery according to a preferred embodiment of the present invention.

<Electrode Sheet for All-Solid State Secondary Battery>

An electrode sheet for an all-solid state secondary battery (hereinafter, also simply referred to as "electrode sheet") according an embodiment of the present invention has a structure in which a current collector and an electrode active material layer are laminated through a primer layer. The primer layer includes a binder (A) as a component. In addition, the electrode active material layer includes an inorganic solid electrolyte (B) having ion conductivity of a metal belonging to Group 1 or Group 2 in the periodic table, an active material (C), and binder particles (D) having an average particle size of 1 nm to 10 μm and further includes the binder (A) on at least an adhesive interface side with the primer layer. The binder (A) in the primer layer or the electrode active material layer does not form a crosslinked structure with the inorganic solid electrolyte (B).

Hereinafter, components that are included in the electrode sheet for an all-solid state secondary battery according to the embodiment of the present invention and components that may be included therein may be described without giving reference numerals thereto. For example, "binder (A)" may also simply referred to as "binder".

The electrode sheet for an all-solid state secondary battery according to the embodiment of the present invention has the above-described configuration and thus has excellent peel strength and excellent electrode flexibility. The reason for this is not clear but is presumed to be the result of the following multiple configurations: the configuration in which the electrode active material layer includes the binder (A) forming the primer layer on the adhesive interface side with the primer layer such that affinity between the primer layer and the electrode active material layer is improved; the configuration in which a crosslinked structure is not formed between the binder (A) and the inorganic solid electrolyte such that they are not embrittled; the configuration in which the electrode active material layer includes the particulate binder (binder particles (D)) as a binder contributing to binding properties between the electrode active material layer and the solid particles such that a variation in binding properties between particles of the inorganic solid electrolyte, between particles of the active material, and between the inorganic solid electrolyte and the active material can be suppressed; and the binder particles themselves exhibit a buffering effect.

<Current Collector (Metal Foil)>

A positive electrode current collector and a negative electrode current collector are preferably an electron conductor.

In the present invention, either or both of the positive electrode current collector and the negative electrode current collector will also be simply referred to as the current collector.

As a material forming the positive electrode current collector, not only aluminum, an aluminum alloy, stainless steel, nickel, or titanium but also a material (a material on which a thin film is formed) obtained by treating the surface of aluminum or stainless steel with carbon, nickel, titanium, or silver is preferable. Among these, aluminum or an aluminum alloy is more preferable.

As a material forming the negative electrode current collector, not only aluminum, copper, a copper alloy, stainless steel, nickel, or titanium but also a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the current collector, typically, current collectors having a film sheet-like shape are used, but it is also possible to use net-shaped collectors, punched collectors, compacts of lath bodies, porous bodies, foaming bodies, or fiber groups, and the like.

The thickness of the current collector is not particularly limited, but is preferably 1 to 500 μm. In addition, it is also preferable that the surface of the current collector is made to be uneven through a surface treatment.

<Primer Layer>

The primer layer functions as an adhesive layer for improving adhesiveness between the current collector and the electrode active material layer. The primer layer is not particularly limited as long as it includes the binder (A) and has electrical conductivity. For example, the primer layer can be formed by coating the current collector with a conductive paint including the binder (A), conductive particles, and a dispersion medium. As the conductive particles, a conductive auxiliary agent can be used.

In addition, it is also preferable that the primer layer includes a conductive polymer (for example, polythiophene, polyaniline, polypyrrole, polyacetylene, or a polymer doped therewith).

In a case where the primer layer includes the conductive polymer, binding properties between the active material layer and the current collector and electrical conductivity of the electrode sheet can be further improved.

The total content of the conductive particles and the conductive polymer in the primer layer is preferably 10% to 99.9 mass % and more preferably 20% to 99.9 mass %.

The thickness of the primer layer preferably is 0.5 to 20 μm and more preferably 1 to 10 μm.

<Electrode Active Material Layer>

The electrode active material layer includes an inorganic solid electrolyte (B) having ion conductivity of a metal belonging to Group 1 or Group 2 in the periodic table, an active material (C), and binder particles (D) having an average particle size of 1 nm to 10 μm and further includes the binder (A) on at least an adhesive interface side with the primer layer. The electrode active material layer may include other components within a range where the effects of the present invention do not deteriorate.

In the electrode sheet for an all-solid state secondary battery according to the embodiment of the present invention, it is preferable that a ratio Bet mass % of a content of the binder (A) in an electrode active material layer ET to a total content of the binder (A) and the binder particles (D) in the electrode active material layer ET and a ratio Bes mass % of a content of the binder (A) in an electrode active material layer ES to a total content of the binder (A) and the binder particles (D) in the electrode active material layer ES satisfy Bet/Bes>1.

In this case, in a case where the electrode active material layer is equally divided into ten sub layers in a thickness direction and the ten sub layers are represented by a to j layers, respectively, in order from a sub layer in contact with the primer layer, the electrode active material layer ET represents the a layer and the electrode active material layer ES represents a layer including the b to j layers.

In a case where Bet and Bes satisfy the above-described expression, an increase in battery resistance in an all-solid state secondary battery according to an embodiment of the present invention can be further suppressed.

In the description of the present invention, each of a positive electrode active material layer CT and a negative electrode active material layer AT corresponds to the electrode active material layer ET. A ratio of the content of the binder (A) in the positive electrode active material layer CT corresponding to Bet is Bet, and a ratio of the content of the binder (A) in the negative electrode active material layer AT corresponding to Bet is Bat.

On the other hand, each of a positive electrode active material layer CS and a negative electrode active material layer ES corresponds to the electrode active material layer ES. A ratio of the content of the binder (A) in the positive electrode active material layer CS corresponding to Bes is Bcs, and a ratio of the content of the binder (A) in the negative electrode active material layer AS corresponding to Bes is Bas.

The ratio of the content is a value measured using a method described in Examples.

In the electrode sheet for an all-solid state secondary battery according to the embodiment of the present invention it is preferable that the electrode active material layer ETO does not include the binder (A).

In this case, in a case where the electrode active material layer is equally divided into ten sub layers in a thickness direction and the ten sub layers are represented by a to j layers, respectively, in order from a sub layer in contact with the primer layer, the electrode active material layer ETO represents the j layer. In a case where the electrode active material layer ETO does not include the binder (A), the battery resistance can be reduced without interrupting conduction of electrons or ions in the electrode active material layer.

In the electrode sheet for an all-solid state secondary battery according to the embodiment of the present invention, it is preferable that the content of the binder (A) decreases from the current collector side of the electrode active material layer toward a side of the electrode active material layer opposite to the current collector. Since the content changes in a gradient manner as described above, an increase in battery resistance in the all-solid state secondary battery according to the embodiment of the present invention can be further suppressed.

In the electrode sheet for an all-solid state secondary battery according to the embodiment of the present invention, in a case where the electrode active material layer is peeled off from the current collector, the peel strength (180° C.) is preferably 60 N/m or higher, more preferably 65 N/m or higher, and still more preferably 70 N/m or higher. The upper limit is not particularly limited and is actually 50,000 N/m or lower.

The electrode sheet for an all-solid state secondary battery according to the embodiment of the present invention can be suitably used for an all-solid state secondary battery. The electrode sheet for an all-solid state secondary battery according to the embodiment of the present invention may include other layers as long as it includes the current collector, the primer layer, and the electrode active material layer. Examples of the other layers include a protective layer and a solid electrolyte layer.

The electrode sheet for an all-solid state secondary battery according to the embodiment of the present invention is a sheet for forming an electrode in the all-solid state secondary battery according to the embodiment of the present invention, in which the primer layer and the active material layer are provided on the metal foil as the current collector. The electrode sheet is typically a sheet including the current collector, the primer layer, and the active material layer, and examples of an aspect thereof include an aspect including the current collector, the primer layer, the active material layer, and the solid electrolyte layer in this order and an aspect including the current collector, the primer layer, the active material layer, the solid electrolyte layer, and the active material layer in this order.

The thickness of each of the layers forming the electrode sheet is the same as the thickness of each of layers described below regarding the all-solid state secondary battery according to the embodiment of the present invention.

Each of the layers forming the electrode sheet according to the embodiment of the present invention may include at least one of a dispersion medium or a solvent within a range not affecting battery performance. Specifically, the content of the dispersion medium or the solvent may be 1 ppm to 10000 ppm with respect to the total mass of the electrode sheet.

[All-Solid State Secondary Battery]

The all-solid state secondary battery according to the embodiment of the present invention includes a positive electrode, a negative electrode facing the positive electrode, and a solid electrolyte layer interposed between the positive electrode and the negative electrode. The positive electrode includes the positive electrode active material layer on the positive electrode current collector. The negative electrode includes the negative electrode active material layer on the negative electrode current collector. At least one of the positive electrode or the negative electrode is formed using the electrode sheet according to the embodiment of the present invention, and the primer layer (not illustrated) is provided between the current collector and the active material layer.

Hereinafter, a preferred embodiments of the present invention will be described with reference to FIG. 1, but the present invention is not limited thereto.

FIG. 1 is a cross-sectional view schematically illustrating an all-solid state secondary battery (lithium ion secondary battery) according to the preferred embodiment of the present invention. In the case of being seen from the negative electrode side, an all-solid state secondary battery 10 of the present embodiment includes a negative electrode current collector 1, a negative electrode active material layer 2, a solid electrolyte layer 3, a positive electrode active material layer 4, and a positive electrode current collector 5 in this order. The respective layers are in contact with one another and have a laminated structure. In a case in which the above-described structure is employed, during charging, electrons ($e^-$) are supplied to the negative electrode side, and lithium ions ($Li^+$) are accumulated in the negative electrode side. On the other hand, during discharging, the lithium ions ($Li^+$) accumulated in the negative electrode side return to the positive electrode, and electrons are supplied to an operation portion 6. In an example illustrated in the drawing, an electric bulb is employed as the operation portion 6 and is lit by discharging. Although not illustrated in FIG. 1, the primer layer is provided at least between the negative electrode current collector 1 and the negative electrode active material layer 2 or between the positive electrode active material layer 4 and the positive electrode current collector 5.

The respective components included in the positive electrode active material layer 4, the solid electrolyte layer 3, and the negative electrode active material layer 2 may be the same as or different from each other unless specified otherwise.

In the present specification, the electrode active material layers (the positive electrode active material layer (hereinafter, also referred to as positive electrode layer") and the negative electrode active material layer (hereinafter, also referred to as "negative electrode layer")) will also be referred to as "active material layer".

In a case where the all-solid state secondary battery having a layer configuration illustrated in FIG. 1 is put into a 2032-type coin case, the all-solid state secondary battery having the layer configuration illustrated in FIG. 1 will be referred to as "laminate for an all-solid state secondary battery", and a battery prepared by putting this laminate for an all-solid state secondary battery into a 2032-type coin case will be referred to as "all-solid state secondary battery", thereby referring to both batteries distinctively in some cases.

The thicknesses of the positive electrode active material layer 4, the solid electrolyte layer 3, and the negative electrode active material layer 2 are not particularly limited. In consideration of the dimension of a general battery, the thicknesses are preferably 10 to 1,000 μm and more preferably 20 μm or more and less than 500 μm. In the all-solid state secondary battery according to the embodiment of the present invention, the thickness of at least one layer of the positive electrode active material layer 4, the solid electrolyte layer 3, or the negative electrode active material layer 2 is still more preferably 50 μm or more and less than 500 μm. In addition, the thickness of the primer layer is not particularly limited and is preferably 1 μm or more and less than 50 μm and more preferably 10 μm or more and less than 30 μm.

In the present invention, a functional layer, a member, or the like may be appropriately interposed or disposed between the respective layers of the negative electrode active material layer, the solid electrolyte layer, and the positive electrode active material layer and on the outside of the negative electrode current collector and the positive electrode current collector. In addition, each of the layers may have a single-layer structure or a multi-layer structure.

[Case]

A basic structure of the all-solid state secondary battery can be prepared by disposing the above-described respective layers. Depending on uses, the all-solid state secondary battery according to the embodiment of the present invention may be used as an all-solid state secondary battery as it is but is sealed in an appropriate case to be used in the form of a dry cell. The case may be a metallic case or a resin (plastic) case. In a case where a metallic case is used, examples thereof include an aluminum alloy case and a stainless steel case. It is preferable that the metallic case is classified into a positive electrode-side case and a negative electrode-side case and that the positive electrode-side case and the negative electrode-side case are electrically connected to the positive electrode current collector and the negative electrode current collector, respectively. The positive electrode-side case and the negative electrode-side case are preferably integrated by being joined together through a gasket for short circuit prevention.

Hereinafter, components that are included in the primer layer or the electrode active material layer forming the electrode sheet according to the embodiment of the present invention and components that may be included therein will be described.

(Binder (A))

The binder (A) is included in the primer layer. The binder (A) is not particularly limited as long as has affinity to the current collector and has affinity to a material (for example, a conductive auxiliary agent) for forming the primer layer. In addition, the binder (A) is included on at least an interface side between the electrode active material layer and the primer layer, which effectively improves binding properties between the primer layer and the electrode active material layer. In the present invention, a crosslinked structure is not formed between the binder (A) and the inorganic solid electrolyte (B). That is, a ratio of a component having a carbon-carbon double bond to all the components of a compound (polymer) forming the binder (A) is preferably 10 mol % or lower and more preferably 5 mol % or lower. In addition, this ratio is preferably 10 mass % or lower, more preferably 8 mass % or lower, and still more preferably 6 mass % or lower. It is also preferable that the compound forming the binder (A) does not include the component having a carbon-carbon double bond. The above-described "carbon-carbon double bond" does not include a double bond of an aromatic ring.

As the binder (A), for example, a resin material such as a rubber, a thermoplastic elastomer, a hydrocarbon resin, a silicone resin, an acrylic resin, or a fluororubber can be used.

Specific examples of the rubber include a hydrocarbon rubber (for example, butadiene rubber, styrene-butadiene rubber, acrylonitrile-butadiene rubber, or hydrogenated rubber thereof), a fluororubber (for example, polyvinylidene fluoride (PVdF), a copolymer of vinylidene fluoride and hexafluoropropylene, or polytetrafluoroethylene (PTFE)), and a cellulose rubber and an acrylic rubber (for example, acrylic acid ester).

Specific examples of the thermoplastic elastomer include a copolymer of styrene, ethylene, and butylene, an olefin elastomer, a urethane elastomer, an ester elastomer, and an amide elastomer. The elastomer is a resin including a so-called hard segment and a so-called soft segment and exhibits rubber elasticity at normal temperature (25° C.).

The hydrocarbon resin refers to a resin other than a rubber and a thermoplastic elastomer in which at least one component is a hydrocarbon compound component. Specific examples of the hydrocarbon resin include a styrene-olefin copolymer, a polyolefin, and a component in which the above-described polymer further has a (meth)acryloyl group.

The acrylic resin refers to a resin other than a rubber and a thermoplastic elastomer, the resin including at least one of a component having a (meth)acryloyl group or an acrylonitrile component as a component and not including a hydrocarbon compound component as a component. The acrylic resin is preferably a poly(meth)acrylic acid ester.

In particular, from the viewpoints of affinity to the conductive auxiliary agent, high solubility in the solvent, and binding properties, a hydrocarbon resin, an acrylic resin, a rubber, or a thermoplastic elastomer is preferable, a hydrocarbon resin, a hydrocarbon rubber, or an acrylic resin is more preferable, and a hydrocarbon resin is still more preferable.

In the present invention, from the viewpoints of excellent affinity to the conductive auxiliary agent and solubility in the solvent, it is preferable that the structure of the compound (polymer) forming the binder (A) is different from the structure a compound (polymer) forming the binder particles (D).

As the binder (A), one kind may be used alone, or two or more kinds may be used in combination.

It is preferable that the binder (A) has an unstructured shape in the solid electrolyte composition, the electrode sheet for an all-solid state secondary battery, or the all-solid state secondary battery.

In addition, the binder (A) may be a particulate polymer having a thickness of 0.05 to 50 μm in order to suppress the formation of a resistance film formed in a case where the active material or the inorganic solid electrolyte is coated with the polymer.

In a case where the binder (A) used in the present invention is particulate, the average particle size thereof can be determined using the same method as that of the average particle size of the binder particles (D) described below.

The moisture content of the compound forming the binder (A) used in the present invention is preferably 100 ppm (by mass) is lower.

In addition, the compound forming the binder (A) used in the present invention may be used in the form of a solid or may be used in the form of a dispersion liquid or a solution.

The mass average molecular weight of the compound forming the binder (A) used in the present invention is preferably 5,000 or higher, more preferably 10,000 or higher, and still more preferably 20,000 or higher. The upper limit is preferably 1,000,000 or lower, more preferably 200,000 or lower, and still more preferably 100,000 or lower.

—Measurement of Molecular Weight—

In the present invention, unless specified otherwise, the molecular weights of the binder (A) and the binder particles (D) refer to mass average molecular weights and are obtained by measuring the mass average molecular weights in terms of standard polystyrene by gel permeation chromatography (GPC). Regarding a measurement method, the values are measured using a method under the following conditions A or conditions B (preferred). In this case, an appropriate eluent may be selected and used depending on the kinds of the binder (A) and the binder particles (D).

(Conditions A)

Column: Two TOSOH TSKgel Super AWM-H's (trade name) connected together

Carrier: 10 mM LiBr/N-methylpyrrolidone

Measurement temperature: 40° C.

Carrier flow rate: 1.0 mL/min

Sample concentration: 0.1 mass %

Detector: refractive index (RI) detector (Conditions B) Preferred

Column: A column obtained by connecting TOSOH TSKgel Super HZM-H (trade name), TOSOH TSKgel Super HZ4000 (trade name), and TOSOH TSKgel Super HZ2000 (trade name)

Carrier: tetrahydrofuran

Measurement temperature: 40° C.

Carrier flow rate: 1.0 mL/min

Sample concentration: 0.1 mass %

Detector: refractive index (RI) detector

From the viewpoints of reducing the interface resistance during use in the all-solid state secondary battery and maintaining the reduced interface resistance, the content of the binder (A) in the primer layer is preferably 0.1 mass % or higher, more preferably 1 mass % or higher, and still more preferably 3 mass % or higher. From the viewpoint of battery characteristics, the upper limit is preferably 90 mass % or lower, more preferably 80 mass % or lower, and still more preferably 70 mass % or lower. In addition, the upper limit may be 60 mass % or lower and is preferably 50 mass % or lower, 40 mass % or lower, or 30 mass % or lower.

From the viewpoints of favorably reducing the interface resistance during use in the all-solid state secondary battery and maintaining the reduced interface resistance, the content of the binder (A) in the electrode active material layer is preferably 1 mass ppm or higher, more preferably 5 mass ppm or higher, and still more preferably 10 mass ppm or higher. From the viewpoint of battery characteristics, the upper limit is preferably 5 mass % or lower, more preferably 2 mass % or lower, and still more preferably 1 mass % or lower.

In the present invention, a mass ratio [(the mass of the inorganic solid electrolyte+the mass of the active material)/(the mass of the binder (A))] of the total mass (total amount) of the inorganic solid electrolyte and the active material to the mass of the binder (A) in the electrode active material layer is preferably in a range of 100,000 to 1. The ratio is still more preferably 10,000 to 10 and still more preferably 1,000 to 20.

(Inorganic Solid Electrolyte (B) Having Ion Conductivity of Metal Belonging to Group 1 or Group 2 in Periodic Table)

In the present specification, "the inorganic solid electrolyte (B) having ion conductivity of a metal belonging to Group 1 or Group 2 in the periodic table" will also be simply referred to as "inorganic solid electrolyte (B)" or "inorganic solid electrolyte".

The inorganic solid electrolyte is an inorganic solid electrolyte, and the solid electrolyte refers to a solid-form electrolyte capable of migrating ions therein. The inorganic solid electrolyte is clearly distinguished from organic solid electrolytes (polymer electrolytes such as polyethylene oxide (PEO) and organic electrolyte salts such as lithium bis(trifluoromethanesulfonyl)imide (LiTFSI)) since the inorganic solid electrolyte does not include any organic substance as a principal ion conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers ($LiPF_6$, $LiBF_4$, LiFSI, LiCl, and the like). The inorganic solid electrolyte is not particularly limited as long as it has ion conductivity of a metal belonging to Group 1 or Group 2 in the periodic table and generally does not have electron conductivity.

In the present invention, the inorganic solid electrolyte has conductivity of an ion of a metal belonging to Group 1 or Group 2 in the periodic table. The inorganic solid electrolyte can be appropriately selected from solid electrolyte materials to be applied to this kind of products and used. Representative examples of the inorganic solid electrolyte include (i) a sulfide-based inorganic solid electrolyte and (ii) an oxide-based inorganic solid electrolyte. In the present invention, a more favorable interface can be formed between the active material and the inorganic solid electrolyte. Therefore, a sulfide-based inorganic solid electrolyte is preferably used.

(i) Sulfide-Based Inorganic Solid Electrolyte

The sulfide-based inorganic solid electrolyte is preferably a compound that contains a sulfur atom (S), has ion conductivity of a metal belonging to Group 1 or Group 2 in the periodic table, and has electron-insulating properties. The sulfide-based inorganic solid electrolyte is preferably an inorganic solid electrolyte that contains at least Li, S, and P as elements and has lithium ion conductivity. However, the sulfide-based inorganic solid electrolyte may include elements other than Li, S, and P depending on the purposes or cases.

Examples of the sulfide-based inorganic solid electrolyte include a lithium ion-conductive inorganic solid electrolyte satisfying a composition represented by the following Formula (I).

$$L_{a1}M_{b1}P_{c1}S_{d1}A_{e1} \qquad \text{Formula (I)}$$

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F. a1 to e1 represent the compositional ratios among the respective elements, and a1:b1:c1:d1:e1 satisfies 1 to 12:0 to 5:1:2 to 12:0 to 10. Further, a1 is preferably 1 to 9 and more preferably 1.5 to 7.5. b1 is preferably 0 to 3 and more preferably 0 to 1. Further, d1 is preferably 2.5 to 10 and more preferably 3.0 to 8.5. Further, e1 is preferably 0 to 5 and more preferably 0 to 3.

The compositional ratios among the respective elements can be controlled by adjusting the ratios of raw material compounds blended to manufacture the sulfide-based inorganic solid electrolyte as described below.

The sulfide-based inorganic solid electrolyte may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphoruspentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S$:$P_2S_5$. In a case in which the ratio between $Li_2S$ and $P_2S_5$ is set in the above-described range, it is possible to increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

As specific examples of the sulfide-based inorganic solid electrolytes, combination examples of raw materials will be described below. Examples thereof include $Li_2S—P_2S_5$, $Li_2S—P_2S_5—LiCl$, $Li_2S—P_2S_5—H_2S$, $Li_2S—P_2S_5—H_2S—LiCl$, $Li_2S—LiI—P_2S_5$, $Li_2LiI—Li_2O—P_2S_5$, $Li_2S—LiBr—P_2S_5$, $Li_2S—Li_2O—P_2S_5$, $Li_2S—Li_3PO_4—P_2S_5$, $Li_2S—P_2S_5—P_2O_5$, $Li_2S—P_2S_5—SiS_2$, $Li_2S—P_2S_5—SiS_2—LiCl$, $Li_2S—P_2S_5—SnS$, $Li_2S—P_2S_5—Al_2S_3$, $Li_2S—GeS_2$, $Li_2S—GeS_2—ZnS$, $Li^2S—Ga_2S_3$, $Li_2S—GeS_2—Ga_2S_3$, $Li_2S—GeS_2—P_2S_5$, $Li_2S—GeS_2—Sb_2S_5$, $Li_2S—GeS_2—Al_2S_3$, $Li_2S—SiS_2$, $Li_2S—Al_2S_3$, $Li_2S—SiS_2Al_2S_3$, $Li_2S—SiS_2—P_2S_5$, $Li_2S—SiS_2—P_2S_5—LiI$, $Li_2S—SiS_2—LiI$, $Li_2S—SiS_2—Li_4SiO_4$, $Li_2S—SiS_2—Li_3PO_4$, and $Li_{10}GeP_2S_{12}$. Mixing ratios of the respective raw materials do not matter. Examples of a method for synthesizing the sulfide-based inorganic solid electrolyte material using the above-described raw material compositions include an amorphorization method. Examples of the amorphorization method include a mechanical milling method, a solution method, and a melting quenching method. This is because treatments at a normal temperature become possible, and it is possible to simplify manufacturing steps.

(ii) Oxide-based Inorganic Solid Electrolyte

The oxide-based inorganic solid electrolyte is preferably a compound that contains an oxygen atom (O), has ion conductivity of a metal belonging to Group 1 or Group 2 in the periodic table, and has electron-insulating properties.

Specific examples of the compound include $Li_{xa}La_{ya}TiO_3$ [xa=0.3 to 0.7 and ya=0.3 to 0.7] (LLT), $Li_{xb}La_{yb}Zr_{zb}M^{bb}_{mb}O_{nb}$ ($M^{bb}$ is at least one element of Al, Mg, Ca, Sr, V, Nb, Ta, Ti, Ge, In or Sn, xb satisfies 5≤xb≤10, yb satisfies 1≤yb≤4, zb satisfies 1≤zb≤4, mb satisfies 0≤mb≤2, and nb satisfies 5≤nb≤20), $Li_{xc}B_{yc}M^{cc}_{zc}O_{nc}$ ($M^{cc}$ is at least one element of C, S, Al, Si, Ga, Ge, In, or Sn, xc satisfies 0≤xc≤5, yc satisfies 0≤yc≤1, zc satisfies 0≤zc≤1, and nc satisfies 0≤nc≤6), $Li_{xd}(Al, Ga)_{yd}(Ti, Ge)_{zd}Si_{ad}P_{md}O_{nd}$ (1≤xd≤3, 0≤yd≤1, 0≤zd≤2, 0≤ad≤1, 1≤md≤7, 3≤nd≤13), $Li_{(3-2xe)}M^{ee}_{xe}D^{ee}O$ (xe represents a number of 0 or more and 0.1 or less, and $M^{ee}$ represents a divalent metal atom. $D^{ee}$ represents a halogen atom or a combination of two or more halogen atoms.), $Li_{xf}Si_{yf}O_{zf}$ (1≤xf≤5, 0<yf≤3, 1≤zf≤10), $Li_{xg}S_{yg}O_{zg}$ (1≤xg≤3, 0<yg≤2, 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w<1), $Li_{3.5}Zn_{0.25}GeO_4$ having a lithium super ionic conductor (LISICON)-type crystal structure, $La_{0.55}Li_{0.35}TiO_3$ having a perovskite-type crystal structure, $LiTi_2P_3O_{12}$ having a natrium super ionic conductor (NASICON)-type crystal structure, $Li_{1+xh+yh}(Al, Ga)_{xh}(Ti, Ge)_{2-xh}Si_{yh}P_{3-yh}O_{12}$ (0≤xh≤1, 0≤yh≤1), $Li_7La_3Zr_2O_{12}$ (LLZ) having a garnet-type crystal structure. In addition, phosphorus compounds containing Li, P, and O are also desirable. Examples thereof include lithium phosphate ($Li_3PO_4$) and LiPON in which some of oxygen atoms in lithium phosphate are substituted with nitrogen atoms, $LiPOD^1$ ($D^1$ is at least one element selected from Ti, V, Cr, Mn, Fe, Co, Ni, Cu, Zr, Nb, Mo, Ru, Ag, Ta, W, Pt, Au, or the like). It is also possible to preferably use $LiA^1ON$ ($A^1$ represents at least one element selected from Si, B, Ge, Al, C, Ga, or the like) and the like.

The volume average particle size of the inorganic solid electrolyte is not particularly limited, but is preferably 0.01 μm or more and more preferably 0.1 μm or more. The upper limit is preferably 100 μm or less and more preferably 50 μm or less. The average particle size of the inorganic solid electrolyte particles is measured in the following order. The inorganic solid electrolyte particles are diluted and adjusted to 1 mass % of a dispersion liquid by using water (heptane in a case in which the inorganic solid electrolyte is unstable in water) in a 20 ml sample bottle. The diluted dispersion specimen is irradiated with 1 kHz ultrasonic waves for 10 minutes and is then immediately used for testing. The volume average particle size is obtained by acquiring data 50 times using this dispersion liquid specimen, a laser diffraction/scattering particle size distribution analyzer LA-920 (manufactured by Horiba Ltd.), and a quartz cell for measurement at a temperature of 25° C. Other detailed conditions and the like call be found in JIS Z8828: 2013 "Particle Size Analysis-Dynamic Light Scattering" as necessary. For each level, five samples are prepared and the average value thereof is adopted.

From the viewpoints of reducing the interface resistance during use in the all-solid state secondary battery and maintaining the reduced interface resistance, the total content of the inorganic solid electrolyte and the active material in the solid components of the electrode active material layer is preferably 5 mass % or higher, more preferably 10 mass % or higher, and particularly preferably 20 mass % or higher with respect to 100 mass % of the solid components. From the same viewpoint, the upper limit is preferably 99.9 mass % or lower, more preferably 99.5 mass % or lower, and particularly preferably 99 mass % or lower.

As the inorganic solid electrolyte, one kind may be used alone, or two or more kinds may be used in combination.

In the present specification, the solid content (solid components) refers to components that neither volatilize nor evaporate and disappear in a case where drying is performed at 170° C. for 6 hours in a nitrogen atmosphere. Typically, the solid content refers to components other than a dispersion medium described below.

(Active Material (C))

The electrode active material layer of the embodiment of the present invention may also include the active material (C) capable of intercalating and deintercalating ions of a metal element belonging to Group 1 or Group 2 in the periodic table.

Examples of the active material include a positive electrode active material and a negative electrode active material. In particular, a metal oxide (preferably a transition metal oxide) that is the positive electrode active material, a metal oxide that is the negative electrode active material, or metal such as Sn, Si, Al, or In capable of forming an alloy with lithium is preferable.

In the description of the present invention, the solid electrolyte composition including the active material (the positive electrode active material or the negative electrode active material) will be referred to as a electrode composition (a positive electrode composition or a negative electrode composition).

—Positive Electrode Active Material—

The positive electrode active material is preferably capable of reversibly intercalating and deintercalating lithium ions. The above-described material is not particularly limited as long as the material has the above-described characteristics and may be transition metal oxides, organic substances, elements capable of being complexed with Li such as sulfur, complexes of sulfur and metal, or the like.

Among these, as the positive electrode active material, transition metal oxides are preferably used, and transition metal oxides having a transition metal element $M^a$ (one or more elements selected from Co, Ni, Fe, Mn, Cu, and V) are more preferable. In addition, an element $M^b$ (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. It is more preferable that the transition metal oxide is synthesized by mixing the above components such that a molar ratio $Li/M^a$ is 0.3 to 2.2.

Specific examples of the transition metal oxides include transition metal oxides having a layered rock salt structure (MA), transition metal oxides having a spinel-type structure (MB), lithium-containing transition metal phosphate compounds (MC), lithium-containing transition metal halogenated phosphate compounds (MD), and lithium-containing transition metal silicate compounds (ME).

Specific examples of the transition metal oxides having a layered rock salt structure (MA) include $LiCoO_2$ (lithium cobalt oxide [LCO]), $LiNi_2O_2$ (lithium nickel oxide) $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickel oxide).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphate compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, and $Li_2CoSiO_4$.

In the present invention, the transition metal oxides having a layered rock salt structure (MA) is preferable, and LCO or NMC is more preferable.

The shape of the positive electrode active material is not particularly limited, but is preferably a particle shape. The volume average particle size (circle-equivalent average particle size) of positive electrode active material particles is not particularly limited. For example, the volume average particle diameter can be set to 0.1 to 50 μm. In order to allow the positive electrode active material to have a predetermined particle size, an ordinary pulverizer or classifier may be used. Positive electrode active materials obtained using a calcination method may be used after being washed with water, an acidic aqueous solution, an alkaline aqueous solution, or an organic solvent. The volume average particle size (circle-equivalent average particle size) of positive electrode active material particles can be measured using a laser diffraction/scattering particle size distribution analyzer LA-920 (trade name, manufactured by Horiba Ltd.).

As the positive electrode active material, one kind may be used alone, or two or more kinds may be used in combination.

In the case of forming a positive electrode active material layer, the mass (mg) of the positive electrode active material per unit area ($cm^2$) of the positive electrode active material layer (weight per unit area) is not particularly limited and can be appropriately determined depending on the designed battery capacity.

—Negative Electrode Active Material—

The negative electrode active material is preferably capable of reversibly intercalating and deintercalating lithium ions. The above-described material is not particularly limited as long as the material has the above-described characteristics, and examples thereof include carbonaceous materials, metal oxides such as tin oxide, silicon oxide, metal composite oxides, a lithium single body, lithium alloys such as lithium aluminum alloys, metals capable of forming alloys with lithium such as Sn, Si, Al, and In and the like. Among these, carbonaceous materials or a lithium single body is preferable. In addition, the metal composite oxides are preferably capable of intercalating and deintercalating lithium. The materials are not particularly limited, but preferably include at least one of titanium or lithium as components from the viewpoint of high current density charging-discharging characteristics.

The carbonaceous material which is used as the negative electrode active material is a material substantially containing carbon. Examples thereof include petroleum pitch, carbon black such as acetylene black (AB), graphite (natural graphite, scale-like graphite powder, artificial graphite such as vapor-grown graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

The metal oxides and the metal composite oxides being applied as the negative electrode active material are particularly preferably amorphous oxides, and furthermore, chalcogenides which are reaction products between a metal element and an element belonging to Group 16 in the periodic table are also preferably used. "Amorphous" described herein represents an oxide having a broad scattering band with a peak in a range of 20° to 40° in terms of 2θ when measured by an X-ray diffraction method using CuKα rays, and the oxide may have a crystal diffraction line.

In a compound group consisting of the amorphous oxides and the chalcogenides, amorphous oxides of metalloid elements and chalcogenides are more preferred, and elements belonging to Groups 13 (IIIB) to 15 (VB) of the periodic table, oxides consisting of one element or a combination of two or more elements of Al, Ga, Si, Sn, Ge, Pb, Sb, and Bi, and chalcogenides are particularly preferable. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, these amorphous oxides may be composite oxides with lithium oxide, for example, $Li_2SnO_2$.

The negative electrode active material preferably contains a titanium atom. More specifically, $Li_4Ti_5O_{12}$ (lithium titanium oxide [LTO]) is preferred since the volume fluctuation during the intercalation and deintercalation of lithium ions is small, and thus the high-speed charging-discharging characteristics are excellent, and the deterioration of electrodes is suppressed, whereby it becomes possible to improve the service lives of lithium ion secondary batteries.

In the present invention, a Si-based negative electrode is also preferably applied. Generally, a Si negative electrode is capable of intercalating a larger number of Li ions than a carbon negative electrode (graphite, acetylene black, or the like). That is, the amount of Li ions intercalated per unit mass increases. Therefore, it is possible to increase the battery capacity. As a result, there is an advantage that the battery driving duration can be extended.

The shape of the negative electrode active material is not particularly limited, but is preferably a particle shape. The average particle size of the negative electrode active material is preferably 0.1 to 60 μm. In order to obtain a predetermined particle size, an ordinary pulverizer or classifier is used. For example, a mortar, a ball mill, a sand mill, an oscillatory ball mill, a satellite ball mill, a planetary ball mill, a swirling airflow-type jet mill, a sieve, or the like is preferably used. During the pulverization, wet pulverization of causing water or an organic solvent such as methanol to coexist with the negative electrode active material can be optionally performed. In order to obtain a desired particle size, it is preferable to perform classification. A classification method is not particularly limited, and a method using, for example, a sieve or an air classifier can be optionally used. The classification can be used using a dry method or a wet method. The average particle size of negative electrode active material particles can be measured using the same method as the method of measuring the volume average particle size of the positive electrode active material.

The chemical formulae of the compounds obtained using a calcination method can be calculated using inductively coupled plasma (ICP) optical emission spectroscopy as a measurement method from the mass difference of powder before and after calcinating as a convenient method.

As the negative electrode active material, one kind may be used alone, or two or more kinds may be used in combination.

In the case of forming a negative electrode active material layer, the mass (mg) of the negative electrode active material per unit area ($cm^2$) in the negative electrode active material layer (weight per unit area) is not particularly limited and can be appropriately determined depending on the designed battery capacity.

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, lithium and lithium niobate-based compounds, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, and $B_2O_3$.

In addition, a surface treatment may be carried out on the surfaces of electrodes including the positive electrode active material or the negative electrode active material using sulfur, phosphorous, or the like.

Furthermore, the particle surfaces of the positive electrode active material or the negative electrode active material may be treated with an actinic ray or an active gas (plasma or the like) before or after the coating of the surfaces.

(Binder Particles (D))

The electrode active material layer according to the embodiment of the present invention includes the binder particles (D) having an average particle size of 1 nm to 10 μm.

The binder particles (D) used in the present invention is not particularly limited as long as they are particles of a compound having an average particle size of 1 nm to 10 μm. Specific examples of the binder particles (D) include particles formed of a fluorine-containing resin, a hydrocarbon resin, a rubber, an acrylic resin, or the like.

Examples of the fluorine-containing resin include polytetrafluoroethylene (PTFE), polyvinylidene fluoride (PVdF), and a copolymer (PVdF-HFP) of polyvinylidene fluoride and hexafluoropropylene.

Examples of the hydrocarbon resin and the rubber include polyethylene, polypropylene, styrene-butadiene rubber (SBR), hydrogenated styrene-butadiene rubber (HSBR), butylene rubber, acrylonitrile-butadiene rubber, polybutadiene, and polyisoprene.

Examples of the acrylic resin include various (meth) acrylic monomers, (meth)acrylic acid ester monomers, (meth)acrylamide monomers, and copolymers of monomers forming the above-described resins (specifically, a copolymer of (meth)acrylic acid and alkyl (meth)acrylate (preferably acrylic acid and methyl acrylate)).

In addition, copolymers of vinyl monomers are also be suitably used. Examples of the copolymers include a copolymer of methyl (meth)acrylate and polystyrene, a copolymer of methyl (meth)acrylate and acrylonitrile, and a copolymer of butyl (meth)acrylate, acrylonitrile, and styrene.

In the present specification, the copolymer may be any one of a statistic copolymer, a periodic copolymer, a block copolymer, or a graft copolymer and is preferably a block copolymer.

Examples of other compounds include a urethane resin, polyurea, polyamide, polyimide, a polyester resin, a polyether resin, a polycarbonate resin, and a cellulose derivative resin.

Among these, one kind may be used alone, or two or more kinds may be used in combination.

In order to further improve binding properties between particles of the inorganic solid electrolyte, between particles of the active material, and between the inorganic solid electrolyte and the active material, the binder particles (D) are preferably at least one kind of particles selected from polyamide particles, polyimide particles, polyurea particles, fluorine-containing resin particles, hydrocarbon resin particles, urethane resin particles, or acrylic resin particles described above In the present invention, it is preferable that the binder particles (D) has at east one in the following group of functional groups.

<Group of Functional Groups> an acidic functional group, a basic functional group, a hydroxy group, a cyano group, an alkoxysilyl group, an aryl group, a heteroaryl group, and a hydrocarbon ring group in which three or more rings are fused (condensed).

Examples of the acidic functional group include a carboxylate group (—COOH), a sulfonate group (sulfo group: —$SO_3H$), a phosphate group (phospho group: —$OPO(OH)_2$), a phosphonate group, and a phosphinate group.

Examples of the basic functional group include an amino group, a pyridyl group, an imino group, and an amidine.

The number of carbon atoms in the alkoxysilyl group is preferably 1 to 6, and examples thereof include methoxysilyl, ethoxysilyl, t-butoxysilyl, and cyclohexylsilyl.

The number of carbon atoms forming a ring in the aryl group is preferably 6 to 10, and examples thereof include phenyl and naphthyl. The ring in the aryl group is a monocycle or a ring in which two rings are fused.

The heterocycle in the heteroaryl group is preferably a 4-membered or 10-membered ring, and the number of carbon atoms forming the heterocycle is preferably 3 to 9. Examples of a heteroatom forming the heterocycle include an oxygen atom, a nitrogen atom, and a sulfur atom. Specific examples of the heterocycle include thiophene, furan, pyrrole, and imidazole.

The hydrocarbon ring group in which three or more rings are fused is not particularly limited as long as the hydrocarbon ring is a ring group in which three or more rings are fused. Examples of the fused hydrocarbon ring include a saturated aliphatic hydrocarbon ring, an unsaturated aliphatic hydrocarbon ring, and an aromatic hydrocarbon ring (benzene ring). The hydrocarbon ring is preferably a 5-membered ring or a 6-membered ring.

The hydrocarbon ring group in which three or more rings are fused is preferably a ring group in which three or more rings including at least one aromatic hydrocarbon ring are fused or a ring group in which three or more saturated aliphatic hydrocarbon rings or three or more unsaturated aliphatic hydrocarbon rings are fused.

The number of rings to be fused is not particularly limited and is preferably 3 to 8 and more preferably 3 to 5.

The ring group in which three or more rings including at least one aromatic hydrocarbon ring are fused is not particularly limited, and examples thereof include a ring group including anthracene, phenanthracene, pyrene, tetracene, tetraphen, chrysene, triphenylene, pentacene, pentaphene, perylene, benzo[a]pyrene, coronene, anthanthrene, corannulene, ovalene, graphene, cycloparaphenylene, polyparaphenylene, or cyclophene.

The ring group in which three or more saturated aliphatic hydrocarbon rings or three or more unsaturated aliphatic hydrocarbon rings are fused is not particularly limited, and examples thereof include a ring group formed of a compound having a steroid skeleton. Examples of the compound having a steroid skeleton include a ring group formed of a compound of cholesterol, ergosterol, testosterone, estradiol, aldosterone, hydrocortisone, stigmasterol, thymosterol, lanosterol, 7-dehydrodesmosterol, 7-dehydrocholesterol, cholanic acid, cholic acid, lithocholic acid, deoxycholic acid, sodium deoxycholate, lithium deoxycholate, hyodeoxycholic acid, chenodeoxycholic acid, ursodeoxycholic acid, dehydrocholic acid, hococholic acid, or hyocholic acid.

As the hydrocarbon ring group in which three or more rings are fused, a ring group formed of a compound having a cholesterol ring structure or a pyrenyl group is more preferable.

The above-described functional group has a function of interacting with solid particles of the inorganic solid electrolyte, the active material, and the like to make the particles and the binder particles (D) adsorb each other. The interaction is not particularly limited, and examples thereof include an interaction by a hydrogen bond, an interaction by an acid-base ionic bond, an interaction by a covalent bond, a π-π interaction by an aromatic ring, and a hydrophobic-hydrophobic interaction. The solid particles and the binder particles (D) adsorb to each other due to one or two or more among the above-described interactions depending on the kind of the functional group and the kind of the above-described particles.

In a case where the functional group interacts, as described above, the chemical structure of the functional group may or may not change. For example, in the above-described π-π interaction or the like, typically, the functional group maintains the structure thereof without a change. On the other hand, in the interaction by a covalent bond or the like, typically, the functional group is converted into an anion (the functional group changes) by desorption of active hydrogen such as a carboxylate group and is bonded to the inorganic solid electrolyte.

For example, a carboxylate group, a sulfonate group, a phosphate group, a hydroxy group, a cyano group, or an alkoxysilyl group can be adsorb the positive electrode active material and the inorganic solid electrolyte. Among these, a carboxylate group exhibits excellent adsorption.

For example, an aryl group, a heteroaryl group, or an aliphatic hydrocarbon ring group in which three or more rings are fused can adsorb the negative electrode active material and the conductive auxiliary agent. Among these, the hydrocarbon ring group in which three or more rings are fused exhibits excellent adsorption.

The average particle size of the binder particles (D) is 1 nm to 10 μm, and in order to further improve contact a solid interface at least between particles of the active material in the active material layer, between particles of the inorganic solid electrolyte, or between the inorganic solid electrolyte and the active material, is preferably 1 nm to 500 nm and more preferably 10 nm to 400 nm.

The average particle size of the binder particles (D) is determined using the following method.

The binder particles (D) is diluted using any dispersion medium (a dispersion medium used for preparing the solid electrolyte composition, for example, heptane) in a 20 mL sample bottle to prepare 1 mass % of a dispersion liquid. The diluted dispersion specimen is irradiated with 1 kHz ultrasonic waves for 10 minutes and is then immediately used for testing. The volume average particle size is obtained by acquiring data 50 times using this dispersion liquid specimen, a laser diffraction/scattering particle size distribution analyzer LA-920 (trade name, manufactured by Horiba. Ltd.), and a quartz cell for measurement at a temperature of 25° C. The obtained volume average particle size is set as the average particle size. Other detailed conditions and the like can be found in JIS Z8828: 2013 "Particle Size Analysis-Dynamic Light Scattering" as necessary. For each level, five samples are prepared and measured, and the average value thereof is adopted.

In order to obtain the average particle size of the binder particles (D) from the prepared all-solid state secondary battery, for example, the battery is disassembled to peel off an electrode, the average particle size of an electrode material thereof is measured using the method of measuring the average particle size of the binder particles (D), and the measured value of the average particle size of the particles other than the binder particles (D) obtained in advance is excluded from the average particle size of the electrode material.

The mass average molecular weight of the binder particles (D) is preferably 5,000 or higher and lower than 5,000,000, more preferably 5,000 or higher and lower than 500,000, and still more preferably 5,000 or higher and lower than 100,000.

The upper limit of the glass transition temperature of the binder particles (D) is preferably 80° C. or lower, more preferably 50° C. or lower, and still more preferably 30° C. or lower. The lower limit is not particularly limited and is generally −80° C. or higher.

The binder particles (D) may be used in the form of a solid or in the form of a polymer (B) particle dispersion and is preferably used in the form of a particle dispersion.

The content of the binder particles (D) in the electrode active material layer is preferably 0.01 mass % or higher, more preferably 0.1 mass % or higher, and still more preferably 1 mass % or higher with respect to 100 mass % of the solid components from the viewpoint of satisfying both the binding properties with solid particles and the ion conductivity. From the viewpoint of battery characteristics, the upper limit is preferably 20 mass % or lower, more preferably 10 mass % or lower, and still more preferably 7 mass % or lower.

In the present invention, a mass ratio [(the mass of the inorganic solid electrolyte+the mass of the active material)/(the mass of the binder particles (D))] of the total mass (total amount) of the inorganic solid electrolyte and the active material to the mass of the binder particles (D) in the electrode active material layer according to the present invention is preferably in a range of 1,000 to 1. This ratio is more preferably 500 to 2 and still more preferably 100 to 10.

(Dispersant)

The electrode active material layer according to the embodiment of the present invention may include a dispersant. At least in a case where the content of any one of the electrode active material or the inorganic solid electrolyte is high or in a case where the particle size of the electrode active material and the inorganic solid electrolyte is small such that the surface area increases, by adding the dispersant, the aggregation thereof can be suppressed, and the active material layer and the solid electrolyte layer can be uniformly formed. As the dispersant, a dispersant that is generally used for an all-solid state secondary battery can be appropriately selected and used. Generally, a compound intended for at least one of particle adsorption, steric repulsion or electrostatic repulsion is preferably used.

(Lithium Salt)

The electrode active material layer according to the embodiment of the present invention may include a lithium salt.

The lithium salt is not particularly limited, and, for example, a lithium salt described in paragraphs "0082" to "0085" of JP2015-088486A is preferable.

The content of the lithium salt is preferably 0 parts by mass or more and more preferably 5 parts by mass or more with respect to 100 parts by mass of the inorganic solid electrolyte. The upper limit is preferably 50 parts by mass or less and more preferably 20 parts by mass or less.

(Ionic Liquid)

The electrode active material layer according to the embodiment of the present invention may include an ionic liquid in order to further improve the ion conductivity. The ionic liquid is not particularly limited, but is preferably an ionic liquid dissolving the above-described lithium salt from the viewpoint of effectively improving the ion conductivity. Examples thereof include compounds made of a combination of a cation and an anion described below.

(i) Cation

Examples of the cation include an imidazolium cation, a pyridinium cation, a piperidinium cation, a pyrrolidinium cation, a morpholinium cation, a phosphonium cation, and a quaternary ammonium cation. Here, these cations have a substituent described below.

As the cation, one kind may be used alone, or two or more kinds may be used in combination.

A quaternary ammonium cation, a piperidinium cation, or a pyrrolidinium cation is preferable.

Examples of the substituent that may be included in the above-described cation include an alkyl group (preferably having 1 to 8 carbon atoms and more preferably having 1 to 4 carbon atoms), a hydroxyalkyl group (preferably having 1 to 3 carbon atoms), an alkyloxyalkyl group (an alkyloxyalkyl group having 2 to 8 carbon atoms is preferable, and an alkyloxyalkyl group having 2 to 4 carbon atoms is more preferable), an ether group, an allyl group, an aminoalkyl group (an aminoalkyl group having 1 to 8 carbon atoms is preferable, and an aminoalkyl group having 1 to 4 carbon atoms is more preferable), and an aryl group (an aryl group having 6 to 12 carbon atoms is preferable, and an aryl group having 6 to 8 carbon atoms is more preferable). The substituent may form a cyclic structure in a form of containing a cation site. The substituent may further have a substituent described regarding the above-described dispersion medium. The ether group can be used in combination with other substituents. Examples of the substituent include an alkyloxy group and an aryloxy group.

(ii) Anion

Examples of the anion include a chloride ion, a bromide ion, an iodide ion, a boron tetrafluoride ion, a nitric acid ion, a dicyanamide ion, an acetate ion, an iron tetrachloride ion, a bis(trifluoromethanesulfonyl)imide ion, a bis(fluorosulfonyl)imide ion, a bis(perfluorobutylmethanesulfonyl)imide ion, an allylsulfonate ion, a hexafluorophosphate ion, and a trifluoromethanesulfonate ion.

As the anion, one kind may be used alone, or two or more kinds may be used in combination.

A boron tetrafluoride ion, a bis(trifluoromethanesulfonyl) imide ion, a bis(fluorosulfonyl)imide ion, a hexafluorophosphate ion, a dicyanamide ion, or an allylsulfonate ion is preferable, and a bis(trifluoromethanesulfonyl)imide ion, a bis(fluorosulfonyl)imide ion, or an allylsulfonate ion is more preferable.

Examples of the ionic liquid include 1-allyl-3-ethylimidazolium bromide, 1-ethyl-3-methylimidazolium bromide, 1-(2-hydroxyethyl)-3-methylimidazolium bromide, 1-(2-methoxyethyl)-3-methylimidazolium bromide, 1-octyl-3-methylimidazolium chloride, N,N-diethyl-N-methyl-N-(2-methoxyethyl)ammonium tetrafluoroborate, 1-ethyl-3-methylimidazolium bis(trifluoromethanesulfonyl)imide, 1-ethyl-3-methylimidazolium bis(fluorosulfonyl)imide, 1-ethyl-3-methylimidazolium dicyanamide, 1-butyl-1-methylpyrrolidinium bis(trifluoromethanesulfonyl)imide, trimethylbutylammoniumbis(trifluoromethanesulfonyl)imide, N,N-diethyl-N-methyl-N-(2-methoxyethyl) ammonium bis (trifluoromethanesulfonyl)imide (DEME), N-propyl-N-methylpyrrolidiniumbis(trifluoromethanesulfonyl)imide (PMP), N-(2-methoxyethyl)-N-methylpyrrolidiniumtetrafluoroboride, 1-butyl-1-methylpyrrolidinium bis(fluorosulfonyl)imide, (2-acryloylethyl) trimethylammoniumbis (trifluoromethanesulfonyl)imide, 1-ethyl-1-methylpyrrolidinium allyl sulfonate, 1-ethyl-3-methylimidazolium allylsulfonate, and trihexyltetradecylphosphonium chloride.

The content of the ionic liquid is preferably 0 parts by mass or more, more preferably 1 part by mass or more, and most preferably 2 parts by mass or more with respect to 100 parts by mass of the inorganic solid electrolyte. The upper limit is preferably 50 parts by mass or less, more preferably 20 parts by mass or less, and particularly preferably 10 parts by mass or less.

The mass ratio between the lithium salt and the ionic liquid (the lithium salt:the ionic liquid) is preferably 1:20 to 20:1, more preferably 1:10 to 10:1, and most preferably 1:7 to 2:1.

(Conductive Auxiliary Agent)

The electrode active material layer according to the embodiment of the present invention may include a conductive auxiliary agent. The conductive auxiliary agent is not particularly limited, and conductive auxiliary agents that are known as ordinary conductive auxiliary agents can be used. The conductive auxiliary agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, or a polyphenylene derivative may also be used. In addition, among these, one kind may be used, or two or more kinds may be used.

<Manufacturing of Electrode Sheet for All-Solid State Secondary Battery>

The electrode sheet for an all-solid state secondary battery according to the embodiment of the present invention can be manufactured using an ordinary method. Hereinafter, specific examples of a method of manufacturing the electrode sheet for an all-solid state secondary battery according to the embodiment of the present invention will be described.

(1) Method of Manufacturing Electrode Sheet for all-Solid State Secondary Battery Including One Electrode Active Material Layer (Preparation of Primer Layer-Forming Composition)

A primer layer-forming composition is prepared by mixing the binder (A) and the conductive auxiliary agent with each other in the presence of the solvent to form a slurry or a solution.

The slurry can be formed by mixing the binder (A), the conductive auxiliary agent, and the solvent using various mixing devices. The mixing device is not particularly limited, and examples thereof include a ball mill, a beads mill, a planetary mixer, a blade mixer, a roll mill, a kneader, and a disc mill. The mixing conditions are not particularly limited. However, in a case where a ball mill is used, the inorganic solid electrolyte and the dispersion medium are preferably mixed together at 150 to 700 rpm (rotation per minute) for 1 to 24 hours. After mixing, filtering may be optionally performed.

The conductive auxiliary agent may be added and mixed together or separately with the step of dispersing the binder (A). In addition, in order to prepare the primer layer-forming composition including components such as an antioxidant or a dispersion stabilizer, the components may be added and mixed together or separately with the step of dispersing the binder (A).

(Preparation of Electrode Composition)

Using the same method as that of the primer layer-forming composition, the electrode composition is prepared by dispersing the inorganic solid electrolyte (B), the active material (C), and the binder particles (D) in the presence of the dispersion medium to form a slurry.

(Formation of Sheet)

The primer layer-forming composition is applied to the current collector and is dried to form the primer layer, and the electrode composition is applied to the primer layer and is heated and dried to form the electrode active material layer. In the process of forming the laminate structure as described above, a part of the binder (A) in the primer layer is transferred to the electrode active material layer by permeation or the like during the dispersion of the electrode composition, and a state where the electrode active material layer includes the binder (A) on at least an adhesive interface side with the primer layer can be obtained.

The formation of the primer layer and the electrode active material layer can be applied to the description regarding the formation each of layers described below.

(2) Method of Manufacturing Electrode Sheet for All-Solid State Secondary Battery Including Plurality of Electrode Active Material Layers A method of manufacturing an electrode sheet for an all-solid state secondary battery including a plurality of electrode active material layers is the same as the method of manufacturing an electrode sheet for an all-solid state secondary battery including a plurality of electrode active material layers, except that a plurality of electrode compositions are prepared by dispersing the inorganic solid electrolyte (B), the active material (C), and the binder particles (D) in the presence of the dispersion medium to form a slurry and a plurality of electrode active material layers are formed using the electrode compositions. In this case, at least a layer in contact with the primer layer can include the binder (A).

(Dispersion Medium or Solvent)

Specific examples of the dispersion medium or the solvent used for preparing the primer layer-forming composition and the electrode composition are as follows.

Examples of the alcohol compound solvent include methyl alcohol, ethyl alcohol, 1-propyl alcohol, 2-butanol, ethylene glycol, propylene glycol, glycerin, 1,6-hexanediol, 1,3-butanediol, and 1,4-butanediol.

Examples of an ether compound solvent include alkylene glycol alkyl ether (for example, ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol dimethyl ether, dipropylene glycol monomethyl ether, tripropylene glycol monomethyl ether, diethylene glycol monobutyl ether, or diethylene glycol dibutyl ether), dialkyl ether (for example, dimethyl ether, diethyl ether, or dibutyl ether), tetrahydrofuran, and dioxane (including respective isomers of 1,2-, 1,3, and 1,4-).

Examples of an amide compound solvent include N,N-dimethylformamide, 1-methyl-2-pyrrolidone, 1,3-dimethyl-2-imidazolidinone, 2-pyrrolidinone, ε-caprolactam, formamide, N-methylformamide, acetamide, N-methylacetamide, N,N-dimethylacetamide, N-methylpropanamide, and hexamethylphosphorictriamide.

Examples of an amino compound solvent include triethylamine, and tributylamine.

Examples of a ketone compound solvent include acetone, methyl ethyl ketone, diethyl ketone, dipropyl ketone, and dibutyl ketone.

Examples of an ester compound solvent include methyl acetate, ethyl acetate, propyl acetate, butyl acetate, pentyl acetate, hexyl acetate, methyl propionate, ethyl propionate, propyl propionate, butyl propionate, methyl butyrate, ethyl butyrate, propyl butyrate, butyl butyrate, pentyl butyrate, methyl valerate, ethyl valerate, propyl valerate, butyl valerate, methyl caproate, ethyl caproate, propyl caproate, and butyl caproate.

Examples of an aromatic compound solvent include benzene, toluene, xylene, and mesitylene.

Examples of an aliphatic compound solvent include hexane, heptane, cyclohexane, methyl cyclohexane, octane, pentane, cyclopentane, and cyclooctane.

Examples of a nitrile compound solvent include acetonitrile, propionitrile, and butyronitrile.

Examples of the solvent of the primer layer-forming composition other than the above-described examples include water.

The boiling point of the dispersion medium under normal pressure (1 atm) is preferably 50° C. or higher and more preferably 70° C. or higher. The upper limit is more preferably 250° C. or lower and still more preferably 220° C. or lower. As the dispersion medium, one kind may be used alone, or two or more kinds may be used in combination.

In the present invention, the Log P value of the dispersion medium that disperse the binder particles (D) and the Log P value of the solvent that dissolves the binder (A) are preferably 0.5 or higher, more preferably 1.0 or higher, and still more preferably 2.0 or higher. The upper limit is not particularly limited and is practically 10 or lower.

The Log P value is a value calculated by ChemBioDraw (trade name) Version: 1.2.9.21076 (manufactured by PerkinElmer Co., Ltd.).

Specifically, as the dispersion medium or the solvent used for preparing the primer layer-forming composition and the electrode composition, toluene, xylene, mesitylene, hexane, heptane, or octane is preferable, toluene, heptane, xylene, or octane is more preferable, and heptane, toluene, or xylene is still more preferable.

<Manufacturing of All-solid State Secondary Battery>

The all-solid state secondary battery can be manufactured using an ordinary method except that the above-described method of manufacturing the electrode sheet for an all-solid state secondary battery is performed. Specifically, the all-solid state secondary battery and the electrode sheet for an all-solid state secondary battery can be manufactured by forming the respective layers using the solid electrolyte composition and the like. The details will be described below.

The all-solid state secondary battery according to the embodiment of the present invention can be manufactured using the following method.

The all-solid state secondary battery according to the embodiment of the present invention can be manufactured using a method including (through) a step of forming the primer layer on the metal foil as the current collector using the primer layer-forming composition and a step of applying the electrode composition to the primer layer to form a coating film.

For example, the primer layer is formed on the metal foil as the positive electrode current collector using the primer layer-forming composition, the solid electrolyte composition including the positive electrode active material is applied as the positive electrode composition to the primer layer to form the positive electrode active material layer. As a result, a positive electrode sheet for an all-solid state secondary battery is prepared. Next, the solid electrolyte composition for forming a solid electrolyte layer is applied to the positive electrode active material layer so as to form the solid electrolyte layer. Furthermore, the solid electrolyte composition including the negative electrode active material is applied as the negative electrode composition to the solid electrolyte layer so as to form a negative electrode active material layer. The primer layer is formed on the negative electrode active material layer using the primer layer-forming composition. By laminating the negative electrode current collector (metal foil) on the primer layer, an all-solid state secondary battery having a structure in which the solid electrolyte layer is interposed between the positive electrode active material layer and the negative electrode active material layer can be obtained. Optionally by sealing the laminate in a case, a desired all-solid state secondary battery can be obtained.

As another method, for example, the following method can be used. That is, the positive electrode sheet for an all-solid state secondary battery is prepared as described above. In addition, the primer layer is formed on the metal foil as the negative electrode current collector using the primer layer-forming composition, the solid electrolyte composition including the negative electrode active material is applied as the negative electrode composition to the primer layer to form the negative electrode active material layer. As a result, a negative electrode sheet for an all-solid state secondary battery is prepared. Next, the solid electrolyte layer is formed on the active material layer in any one of the sheets as described above. Furthermore, the other one of the positive electrode sheet for an all-solid state secondary battery and the negative electrode sheet for an all-solid state secondary battery is laminated on the solid electrolyte layer such that the solid electrolyte layer and the active material layer come into contact with each other. This way, an all-solid state secondary battery can be manufactured.

As still another method, for example, the following method can be used. That is, the positive electrode sheet for an all-solid state secondary battery and the negative electrode sheet for an all-solid state secondary battery are produced as described above. In addition, separately from the electrode sheets, the solid electrolyte composition is applied to a substrate to prepare a solid electrolyte sheet for an all-solid state secondary battery including the solid electrolyte layer. Furthermore, the positive electrode sheet for an all-solid state secondary battery and the negative electrode sheet for an all-solid state secondary battery are laminated such that the solid electrolyte layer peeled off from the substrate is interposed therebetween. This way, an all-solid state secondary battery can be manufactured.

An all-solid state secondary battery can also be manufactured by combining the above-described forming methods. For example, the positive electrode sheet for an all-solid state secondary battery, the negative electrode sheet for an all-solid state secondary battery, and the solid electrolyte sheet for an all-solid state secondary battery are prepared respectively. Next, the solid electrolyte layer peeled off from the substrate is laminated on the negative electrode sheet for an all-solid state secondary battery, and the positive electrode sheet for an all-solid state secondary battery is bonded thereto. As a result, an all-solid state secondary battery can be manufactured. In this method, it is also possible to laminate the solid electrolyte layer on the positive electrode sheet for an all-solid state secondary battery and to bond the solid electrolyte layer to the negative electrode sheet for an all-solid state secondary battery.

(Formation of Respective Layers (Film Formation))

The method for applying the solid electrolyte composition is not particularly limited and can be appropriately selected. Examples thereof include coating (preferably wet-type coating), spray coating, spin coating, dip coating, slit coating, stripe coating, and bar coating.

At this time, the solid electrolyte composition may be dried after being applied each time or may be dried after being applied multiple times. The drying temperature is not particularly limited. The lower limit is preferably 30° C. or higher, more preferably 60° C. or higher, and still more preferably 80° C. or higher. The upper limit is preferably 300° C. or lower, more preferably 250° C. or lower, and still more preferably 200° C. or lower. In a case where the solid electrolyte composition is heated in the above-described temperature range, the dispersion medium can be removed to make the composition enter a solid state. In addition, the temperature is not excessively increased, and the respective members of the all-solid state secondary battery are not impaired, which is preferable. Therefore, in the all-solid state secondary battery, excellent total performance can be exhibited, and excellent binding properties can be obtained.

After the application of the respective compositions or after the preparation of the all-solid state secondary battery, the respective layers or the all-solid state secondary battery is preferably pressurized. In addition, the respective layers are also preferably pressurized in a state where they are laminated. Examples of the pressurization method include a method using a hydraulic cylinder pressing machine. The pressure is not particularly limited, but is, generally, preferably in a range of 50 to 1,500 MPa.

In addition, the applied solid electrolyte composition may be heated while being pressurized. The heating temperature is not particularly limited, but is generally in a range of 30° C. to 300° C. The respective layers or the all-solid state secondary battery can also be pressed at a temperature higher than the glass transition temperature of the inorganic solid electrolyte.

The pressurization may be carried out in a state in which the coating solvent or the dispersion medium is dried in advance or in a state in which the coating solvent or the dispersion medium remains.

The respective compositions may be applied at the same time, and the application, the drying, and the pressing may be carried out simultaneously or sequentially. The respective compositions may be applied to separate substrates and then laminated by transfer.

The atmosphere during the pressurization is not particularly limited and may be any one of in the atmosphere, under the dried air (the dew point: −20° C. or lower), in an inert gas (for example, in an argon gas, in a helium gas, or in a nitrogen gas), and the like.

The pressing time may be a short time (for example, within several hours) at a high pressure or a long time (one day or longer) under the application of an intermediate pressure. In the case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be uniform or variable with respect to a pressed portion such as a sheet surface.

The pressing pressure may be variable depending on the area or the thickness of the pressed portion. In addition, the pressure may also be variable stepwise for the same portion.

A pressing surface may be smooth or roughened.

(Initialization)

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Usages of All-solid State Secondary Battery]

The all-solid state secondary battery according to the embodiment of the present invention can be applied to a variety of usages. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, and memory cards. Additionally, examples of consumer usages include automobiles (electric cars and the like), electric vehicles, motors, lighting equipment, toys, game devices, road conditioners, watches, strobes, cameras, medical devices (pacemakers, hearing aids, and shoulder massage devices, and the like). Furthermore, the all-solid state secondary battery can be used for a variety of military usages and universe usages. In addition, the all-solid state secondary battery can also be combined with solar batteries.

The all-solid state secondary battery refers to a secondary battery in which the positive electrode, the negative electrode, and the electrolyte are solid. In other words, the all-solid state secondary battery is distinguished from an electrolyte secondary battery in which a carbonate solvent is used as an electrolytic solution. In particular, the present invention has been made assuming an inorganic all-solid state secondary battery. The all-solid state secondary battery is classified into an organic (polymer) all-solid state secondary battery in which a polymer compound such as polyethylene oxide is used as an electrolyte and an inorganic all-solid state secondary battery in which Li—P—S-based glass, LLT, or LLZ is used as an electrolyte. An organic compound can be applied to the inorganic all-solid state secondary battery as a binder or an additive of the positive electrode active material, the negative electrode active material, and the inorganic solid electrolyte without any interference.

The inorganic solid electrolyte is distinguished from the electrolyte (polymer electrolyte) in which a polymer compound functions as an ion conducting medium, and an inorganic compound functions as an ion conducting medium. Specific examples of the inorganic solid electrolyte include Li—P—S-based glass, LLT, and LLZ. The inorganic solid electrolyte itself does not emit cations (Li ions) and has an ion transport function. On the other hand, a material as an ion donor that is added to an electrolytic solution or a solid electrolyte layer and emits cations (Li ions) will be referred to as an electrolyte. This electrolyte will be referred to as "electrolyte salt" or "supporting electrolyte" in order to distinguish from the electrolyte as the ion transport material. Examples of the electrolyte salt include LiTFSI.

"Composition" described in the present invention refers to a mixture in which two or more components are uniformly mixed. This composition is not particularly limited as long as it substantially maintains uniformity, in which aggregation or uneven distribution may occur within a range where the desired effect can be exhibited.

Examples

Hereinafter, the present invention will be described in more detail on the basis of examples. Meanwhile, the present invention is not interpreted to be limited thereto. "Parts" and "%" that represent compositions in the following examples are mass-based unless particularly otherwise described. In addition, "room temperature" refers to 25° C.

<Synthesis Example of Binder (A)>

(Synthesis of Poly(methyl methacrylate-co-butyl acrylate)

24.0 g of methyl methacrylate (manufactured by Wako Pure Chemical Industries, Ltd.), 96.0 g of butyl acrylate (manufactured by Wako Pure Chemical Industries, Ltd.), and 480.0 g of toluene were added to a 1000 ml three-neck flask equipped with a reflux condenser and a gas introduction coke, nitrogen purge was performed twice, 2.4 g of V-65 (trade name, manufactured by Wako Pure Chemical Industries, Ltd.) as an initiator was added thereto, nitrogen purge was further performed twice, and the components were heated in a nitrogen stream at 70° C. for 3 hours. Heating was continued until disappearance of a peak derived from a residual monomer was verified by NMR. The solution was cooled to a room temperature and then was diluted with toluene until the solid concentration was 10%. As a result, a poly(methyl methacrylate-co-butyl acrylate) solution was obtained (mass average molecular weight: 32,000).

<Synthesis Example of Binder particles (D)>

(Preparation of Acrylic Latex)

A macromonomer as a precursor was synthesized as follows.

190 parts by mass of toluene was added to a 1 L three-neck flask equipped with a reflux cooling pipe and a gas introduction coke, nitrogen gas was introduced at a flow rate of 200 mL/min for 10 minutes, and the solution was heated to 80° C. A liquid (the following formula α) prepared in a separate container was added dropwise to the solution for 2 hours and was stirred at 80° C. for 2 hours. Next, 0.2 g of a radical polymerization initiator V-601 (manufactured by Wako Pure Chemical Industries, Ltd.) was further added, and the solution was stirred at 95° C. for 2 hours. 0.025 parts by mass of 2,2,6,6-tetramethylpiperidine-1-oxyl (manufactured by Tokyo Chemical Industry Co., Ltd.), 13 parts by mass of glycidyl methacrylate (manufactured by Wako Pure Chemical Industries, Ltd.), and 2.5 parts by mass of tetrabutylammonium bromide (manufactured by Tokyo Chemical Industry Co., Ltd.) were added to the solution held at 95° C. after stirring, and the solution was stirred at 120° C. for 3 hours. The obtained mixture was cooled to a room temperature and was added to methanol to be precipitated. Precipitates were separated by filtration and were washed with methanol two times. 300 parts by mass of heptane was added to the precipitates to dissolve the precipitates. By removing a part of the obtained solution by distillation under reduced pressure, a solution of a macromonomer M-1 was obtained. The mass average molecular weight was 16,000.

(Formula α)

Dodecyl methacrylate (manufactured by Wako Pure Chemical Industries, Ltd.) . . . 150 parts by mass Methyl methacrylate (manufactured by Wako Pure Chemical Industries, Ltd.) . . . 59 parts by mass 3-mercaptoisobutyric acid (manufactured by Tokyo Chemical Industry Co., Ltd.) . . . 2 parts by mass V-601 (manufactured by Wako Pure Chemical Industries, Ltd.) . . . 2.0 parts by mass 160 parts by mass of heptane was added to a 1 L three-neck flask equipped with a reflux cooling pipe and a gas introduction coke, nitrogen gas was introduced at a flow rate of 200 mL/min for 10 minutes, and the solution was heated to 80° C. A liquid (a solution in which 90 parts by mass of hydroxyethyl acrylate A-10 (manufactured by Wako Pure Chemical Industries, Ltd.), 7 parts by mass of acrylic acid (manufactured by Wako Pure Chemical Industries, Ltd.), 41 parts by mass (solid content) of the macromonomer M-1, and 1.4 parts by mass of a radical polymerization initiator V-601 (trade name, manufactured by Wako Pure Chemical Industries, Ltd.) were mixed with each other) prepared in a separate container was added dropwise to the solution for 2 hours and was stirred at 80° C. for 2 hours. Next, 2.0 g of V-601 was further added to the obtained mixture, and the solution was stirred at 90° C. for 2 hours. The obtained solution diluted with heptane to obtain a dispersion liquid of acrylic latex. The mass average molecular weight was 89,000, and the particle size was 200 nm.

(Preparation of Urethane Latex)

Terminated diol dodecyl polymethacrylate as a precursor was synthesized.

20 mL of methyl ethyl ketone was added to a 500 mL three-neck flask and was heated at 75° C. in a nitrogen stream. On the other hand, 70 g of dodecyl methacrylate (manufactured by Wako Pure Chemical Industries, Ltd.) and 110 g of methyl ethyl ketone were added to a 500 mL measuring cylinder and were stirred for 10 minutes. 2.9 g of thioglycerol (manufactured by Wako Pure Chemical Industries, Ltd.) as a chain transfer agent and 3.2 g of a radical polymerization initiator V-601 (manufactured by Wako Pure Chemical Industries, Ltd.) were added to the measuring cylinder, and the solution was further stirred for 10 minutes. The obtained monomer solution was added dropwise to the 500 mL three-neck flask for 2 hours, and radical polymerization was caused to start. Further after completion of the dropwise addition, heating and stirring were continued at 75° C. for 6 hours. The obtained polymer solution was concentrated under reduced pressure, methyl ethyl ketone was removed by distillation, and the obtained solid matter was dissolved in heptane. As a result, 292 g of a 25 mass % heptane solution of terminated diol-modified dodecyl polymethacrylate was obtained. The mass average molecular weight of the obtained polymer was 3200.

260 g of the 25 mass % heptane solution of the terminated diol-modified dodecyl polymethacrylate was added to a 1 L three-neck flask and was diluted with 110 g of heptane. 11.1 g of isophorone diisocyanate (manufactured by Wako Pure Chemical Industries, Ltd.) and 0.1 g of NEOSTANN U-600 (trade name, manufactured by Nitto Kasei Co., Ltd.) were added to the solution, and the obtained solution was heated and stirred at 75° C. for 5 hours. Next, a dilute solution obtained by diluting 0.4 g of isophorone diamine (amine compound) with 125 g of heptane was added dropwise for 1 hour. 10 minutes after the start of the dropwise addition, the polymer solution having a transparent color was changed into a solution having a light yellow fluorescent color. The formation of urea colloid was verified from the change. The reaction solution was cooled to a room temperature, and 506 g of 15 mass % heptane of polyurea colloidal particles was obtained. The mass average molecular weight was 9,600.

Next, 3.2 g of m-phenylene diisocyanate (manufactured by Tokyo Chemical Industry Co., Ltd.) and 8.0 g of polyethylene glycol (mass average molecular weight: 400, manufactured by Aldrich) were added to a 50 mL sample bottle. 32.0 g of the 15 mass % heptane solution of polyurea colloidal particles is added to the sample bottle and is dispersed using a homogenizer for 60 minutes while heating the sample bottle at 50° C. During that time, the mixed solution was atomized to form a light orange slurry. The obtained slurry was put into a 200 mL three-neck flask heated to a temperature 80° C. in advance, 0.1 g of NEOSTANN U-600 (trade name, manufactured by Nitto Kasei Co., Ltd.) was added thereto, the obtained solution was heated and stirred at a temperature of 80° C. and a rotation speed of 400 rpm for 2 hours. The slurry was in the form of a white emulsion. A urethane latex was formed from the slurry. The solid content concentration was 40.3%, the mass average molecular weight was 38,000, and the particle size was 150 nm.

<Preparation of Current Collector-Primer Layer Laminate (P-1)>

95 g of carbon black (trade name: Ketjen black EC600JD, manufactured by Ketjen black International) and 10.6 g of SBR (product number: 430072, manufactured by Sigma-Aldrich Corporation) were added to 200 g of xylene, and the components were mixed with each other at a room temperature using a planetary mixer. Due to mixing SBR1 was dissolved in xylene. The mixed solution was filtered through a filter having a pore size of 5 μm, and the obtained filtrate was applied to an aluminum foil having a thickness of 20 μm using an applicator (trade name: SA-201 Baker Type applicator, manufactured by Tester Sangyo Co., Ltd.). The applied filtrate was dried with air blow at 100° C. for 4 hours. As a result, a current collector-primer layer laminate was prepared. The thickness of the primer layer P-1 was 5 μm.

Current collector-primer layer laminates shown in Table 1 below other than the current collector-primer layer laminate (P-1) were prepared using the same method as that of the current collector-primer layer laminate (P-1), except that composition was changed as shown in Table 1 below.

TABLE 1

| | | Conductive Auxiliary Agent | | Binder (A) | | | | | |
|---|---|---|---|---|---|---|---|---|---|
| Laminate No. | Current Collector | Kind | Content (Part(s) by Mass) | Kind | Content (Part(s) by Mass) | Mass Ratio of Component having Double Bond | Solvent | LogP | Thickness of Primer layer |
| P-1 | Al Foil, Thickness: 20 μm | KB | 90 | SBR1 | 10 | 4 | Xylene | 3.0 | 5 μm |
| P-2 | Al Foil, Thickness: 20 μm | AB | 85 | Polystyrene-block-poly(ethylene-ran-butylene)-block-polystyrene | 15 | 0 | Toleuen | 2.5 | 5 μm |
| P-3 | Al Foil, Thickness: 20 μm | CPB | 90 | Poly(vinylidene chloride-co-acrylonitrile) | 10 | 0 | Toleuen | 2.5 | 5 μm |
| P-4 | Al Foil, Thickness: 20 μm | AB | 80 | Poly(methyl methacrylate-co-butyl acrylate) | 20 | 0 | Heptane | 3.4 | 5 μm |
| P-5 | Al Foil, Thickness: 20 μm | KB | 90 | Fluororubber | 10 | 0 | Xylene | 3.0 | 5 μm |
| P-6 | Al Foil, Thickness: 20 μm | AB | 85 | Silicone Resin | 15 | 0 | Toleuen | 2.5 | 5 μm |
| P-7 | Al Foil, Thickness: 20 μm | KB | 95 | CMC | 5 | 0 | WAter | — | 2 μm |
| P-8 | SUS Foil, Thickness: 15 μm | KB | 90 | SBR1 | 10 | 4 | Xylene | 3.0 | 5 μm |
| P-9 | SUS Foil, Thickness: 15 μm | AB | 85 | Polystyrene-block-poly(ethylene-ran-butylene)-block-polystyrene | 15 | 0 | Toleuen | 2.5 | 5 μm |
| P-10 | Ni Foil, Thickness: 20 μm | AB | 90 | Poly(vinylidene chloride-co-acrylonitrile) | 10 | 0 | Toleuen | 2.5 | 5 μm |
| P-11 | Al Foil, Thickness: 20 μm | KB | 90 | SBR2 | 10 | 55 | Xylene | 3.0 | 5 μm |
| P-12 | SUS Foil, Thickness: 15 μm | KB | 90 | SBR2 | 10 | 55 | Xylene | 3.0 | 5 μm |

<Note in Table 1>

Laminate: current collector-primer layer laminate

Mass ratio of Component having Double Bond: a mass ratio (mass %) of a component having a double bond in a polymer KB: Ketjen black EC600JD (trade name, manufactured by Ketjen black International)

AB: Acetylene black (manufactured by Denka Co., Ltd.)

CPB: scale-like graphite, manufactured by Nippon Kokuen Group)

SBR1: product number: 430072 (manufactured by Sigma-Aldrich Corporation)

SBR2: product number: 182907 (manufactured by Sigma-Aldrich Corporation)

Polystyrene-block-poly(ethylene-ran-butylene)-block-polystyrene: product number: 200565 (manufactured by Sigma-Aldrich Corporation)

Poly(vinylidene chloride-co-acrylonitrile): product number: 496707 (manufactured by Sigma-Aldrich Corporation)

Poly(methyl methacrylate-co-butyl acrylate): the above-described synthesized binder (A), mass average molecular weight: 25,000

CMC: trade name: SEROGEN 3H (manufactured by DKS Co. Ltd.)

Fluororubber: trade name: DIEL G-704 (manufactured by Daikin Industries Ltd.)

Silicone resin: trade name: KR-242A (manufactured by Shin-Etsu Chemical Co., Ltd.)

—Synthesis of Sulfide-Based Inorganic Solid Electrolyte (Li—P—S-Based Glass)

A sulfide-based inorganic solid electrolyte was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a glove box under an argon atmosphere (dew point: −70° C.), lithium sulfide ($Li_2S$, manufactured by Aldrich-Sigma, Co. LLC. Purity: >99.98%) (2.42 g) and diphosphoruspentasulfide ($P_2S_5$, manufactured by Aldrich-Sigma, Co. LLC. Purity: >99%) (3.90 g) were respectively weighed, put into an agate mortar, and mixed using an agate mortar for five minutes. The molar ratio between $Li_2S$ and $P_2S_5$ ($Li_2S:P_2S_5$) was set to 75:25 in terms of molar ratio.

Sixty six zirconia beads having a diameter of 5 mm were put into a 45 mL zirconia container (manufactured by Fritsch Japan Co., Ltd.), the full amount of the mixture of the lithium sulfide and the diphosphoruspentasulfide was put thereinto, and the container was sealed in an argon atmosphere. The container was set in a planetary ball mill P-7 (trade name) manufactured by Fritsch Japan Co., Ltd., mechanical milling was carried out at a temperature of 25°

C. and a rotation speed of 510 rpm for 20 hours, and a yellow powder (6.20 g) of a sulfide-based inorganic solid electrolyte (Li—P—S-based glass) was obtained.

—Preparation of Positive Electrode Composition (C-1)—

180 zirconia beads having a diameter of 5 mm were put into a 45 mL container (manufactured by Fritsch Japan Co., Ltd.), and 3.0 g of the above-described synthesized Li—P—S-based glass, and 12.3 g of toluene as a dispersion medium were put thereinto. The container was set in a planetary ball mill P-7 (trade name, manufactured by Fritsch Japan Co., Ltd.) and the components were mixed together for 2 hours at a temperature of 25° C. and a rotation speed of 300 rpm. Next, 7.0 g of NMC ($LiNi_{0.33}Co_{0.33}Mn_{0.33}O_2$, manufactured by Sigma-Aldrich Corporation) as an active material was put into the container, and a conductive auxiliary agent and binder particles shown in Table 2 below were put thereinto. Next, using the same method, the container was set in a planetary ball mill P-7 (trade name, manufactured by Fritsch Japan Co., Ltd.) and the components were continuously mixed together for 10 minutes at a temperature of 25° C. and a rotation speed of 100 rpm. As a result, a positive electrode composition (C-1) was prepared.

Positive electrode compositions shown in Table 2 below other than the positive electrode composition (C-1) were prepared using the same method as that of the positive electrode composition (C-1), except that the composition was changed as shown in Table 2 below. In Table 2, other binder components are components corresponding to the binder (A).

TABLE 2

| Positive Electrode Composition | Inorganic Solid Electrolyte Kind | Inorganic Solid Electrolyte Addition Amount (g) | Positive Electrode Active Material Kind | Positive Electrode Active Material Addition Amount (g) | Conductive Auxiliary Agent Kind | Conductive Auxiliary Agent Addition Amount (g) | Binder Particles Kind |
|---|---|---|---|---|---|---|---|
| C-1 | Li—P—S | 2.6 | NMC | 7 | AB | 0.2 | Acryl Particles |
| C-2 | Li—P—S | 2.6 | NMC | 7 | VGCF | 0.2 | PAN Particles |
| C-3 | Li—P—S | 2.6 | NMC | 7 | AB | 0.2 | Acrylic Latex |
| C-4 | Li—P—S | 2.6 | NMC | 7 | VGCF | 0.2 | Urethane Latex |
| C-5 | LLZ | 2.6 | LCO | 7 | AB | 0.2 | PAN Particles |
| C-6 | Li—P—S | 2.6 | LCO | 7 | AB | 0.2 | Acrylic Latex |
| C-7 | Li—P—S | 2.6 | LCO | 7 | AB | 0.2 | Urethane Latex |
| C-8 | Li—P—S | 2.6 | NMC | 7 | AB | 0.2 | Acrylic Latex |
| C-9 | Li—P—S | 2.6 | NMC | 7 | AB | 0.2 | Acrylic Latex |
| C-10 | Li—P—S | 2.6 | NMC | 7 | AB | 0.2 | Acrylic Latex |
| CC-1 | Li—P—S | 2.6 | NMC | 7 | AB | 0.2 | UF-20S |
| CC-2 | Li—P—S | 2.6 | NMC | 7 | VGCF | 0.2 | — |

| Positive Electrode Composition | Binder Particles Average Particle Size (μm) | Binder Particles Addition Amount (g) | Other Binder Component Kind | Other Binder Component Addition Amount (g) | Dispersion Medium Kind | Dispersion Medium Addition Amount (g) |
|---|---|---|---|---|---|---|
| C-1 | 5 | 0.2 | — | — | Toluene | 12.3 |
| C-2 | 7 | 0.2 | — | — | Xylene | 12.3 |
| C-3 | 0.2 | 0.2 | — | — | Heptane | 12.3 |
| C-4 | 0.15 | 0.2 | — | — | Heptane | 12.3 |
| C-5 | 7 | 0.2 | — | — | Xylene | 12.3 |
| C-6 | 0.2 | 0.15 | Silicone Resin | 0.05 | Heptane | 12.3 |
| C-7 | 0.15 | 0.18 | CMC | 0.02 | Heptane | 12.3 |
| C-8 | 5 | 0.198 | Poly(methyl methacrylate-co-butyl acrylate) | 0.002 | Toluene | 12.3 |
| C-9 | 5 | 0.1992 | Poly(methyl methacrylate-co-butyl acrylate) | 0.0008 | Toluene | 12.3 |
| C-10 | 5 | 0.1996 | Poly(methyl methacrylate-co-butyl acrylate) | 0.0004 | Toluene | 12.3 |
| CC-1 | 20 | 0.2 | — | — | Heptane | 12.3 |
| CC-2 | — | — | SBR2 | 0.2 | Xylene | 12.3 |

<Note in Table 2>

Li—P—S: Li—P—S-based glass synthesized above

LLZ: $Li_7La_3Zr_2O_{12}$ (manufactured by Toshima Manufacturing Co., Ltd.)

LCO: $LiCoO_2$ (manufactured by Sigma-Aldrich Corporation)

NMC: $LiNi_{0.33}Co_{0.33}Mn_{0.33}O_2$ (manufactured by Sigma-Aldrich Corporation)

AB: refer to the note in Table 1

VGCF: vapor-grown carbon fiber (manufactured by Showa Denko K.K.)

Acryl particles: trade name TAFTIC FH-S005 (average particle size: 5 μm, manufactured by Toyobo Co., Ltd.)

PAN particles: trade name ASF-7 (average particle size: 7 μm, manufactured by Toyobo Co., Ltd.)

Acrylic latex: the binder particles (D) prepared as described above, mass average molecular weight: 89,000

Urethane latex: the binder particles (D) prepared as described above, mass average molecular weight: 38,000

UF-20S trade name FLO-THENE UF-20S (manufactured by Sumitomo Seika Chemicals Co., Ltd., polyethylene powder, average particle size: 20 μm)

Silicone resin: refer to the note of Table 1

CMC: refer to the note in Table 1

Poly(methyl methacrylate-co-butyl acrylate): refer to the note in Table 1

SBR2: product number: 182907 (manufactured by Sigma-Aldrich Corporation)

<Preparation of Positive Electrode Sheet (CP-1) for All-Solid State Secondary Battery>

The positive electrode composition (C-1) prepared as described above was applied to the primer layer of the current collector-primer layer laminate (P-1) using an applicator (trade name: SA-201 Baker Type applicator, manufactured by Tester Sangyo Co., Ltd.), was heated at 80° C. for 1 hour, and was further dried at 110° C. for 1 hour. Next, the laminate was pressurized (20 MPa, 1 minute) while being heated (120° C.) using a heat press machine. As a result, a positive electrode sheet CP-1 for an all-solid state secondary battery having a laminate structure of positive electrode active material layer/primer layer/aluminum foil was prepared.

<Preparation of Positive Electrode Sheet (CP-13) for All-Solid State Secondary Battery>

The positive electrode composition (C-8) prepared as described above was applied to the primer layer of the current collector-primer layer laminate (P-4) using an applicator (trade name: SA-201 Baker Type applicator, manufactured by Tester Sangyo Co., Ltd.), was heated at 80° C. for 1 hour, and was further dried at 110° C. for 1 hour. Next, the positive electrode composition (C-9) prepared as described above was applied to the layer formed of the positive electrode composition (C-8) using the applicator, was heated at 80° C. for 1 hour, and was dried at 110° C. for 1 hour. At this time, a thickness ratio between the layer formed of the positive electrode composition (C-8) and the layer formed of the positive electrode composition (C-9) was adjusted to 1:9. Next, the laminate was pressurized (20 MPa, 1 minute) while being heated (120° C.) using a heat press machine. As a result, a positive electrode sheet CP-13 for an all-solid state secondary battery having a laminate structure of positive electrode active material layer/primer layer/aluminum foil was prepared.

Positive electrode sheets (CP-2), (CP-12), and (CCP-1) to (CCP-4) were prepared using the same method as that of the positive electrode sheet (CP-1), except that the composition was changed as shown in Table 3 below. A positive electrode sheet (CP-14) was prepared using the same method as that of the positive electrode sheet (CP-13), except that the composition was changed as shown in Table 3 below. It was verified that, in the positive electrode sheets (CP-1), (CP-8) to (CP-11) and (CCP-4) including P-1, a crosslinked structure was not formed between the binder (A) and the inorganic solid electrolyte. On the other hand, in (CCP-1) to (CCP-3), a crosslinked structure was formed between the binder (A) and the inorganic solid electrolyte.

Using each of the prepared positive electrode sheets, a peel strength test and an electrode flexibility test were performed. The results are shown in Table 3 below.

<Peel Strength Test>

A 180 degree peel strength test (according to J1S Z0237-2009) was performed. A pressure-sensitive adhesive tape (width: 24 mm, length: 300 mm, trade name: CELLOTAPE (registered trade name) CT-24, manufactured by Nichiban Co., Ltd.) was attached to the active material layer of the positive electrode sheet, an end of the tape was held, was folded by 180 degrees, and was peeled off up to 25 mm. Next, the laminate was disposed in a tester below, and the test was performed at 300 mm/min. In a case where the tape was peeled off up to 25 mm to 50 mm after the start of the measurement, the average peel strength was obtained. The evaluation standards are as follows. Rank C or higher is an acceptable level of the present test.

Tester: a combination of a standard-type digital force gauge ZTS-5N and a vertical electric measurement stand MX2 series (all trade names, manufactured by IMADA Co., Ltd.)

—Evaluation Standards—

A: 80 N/m or higher

B: 60 N/m or higher and lower than 80 N/m

C: 40 N/m or higher and lower than 60 N/m

D: 20 N/m or higher and lower than 40 N/m

E: lower than 20 N/m

<Electrode Flexibility Test>

A bending resistance test using a mandrel tester (according to JIS K5600-5-1) was performed. A strip-shaped specimen having a width of 50 mm and a length of 100 mm was cut out from the positive electrode sheet. The active material layer surface was set opposite to the mandrel, the specimen was bent using the mandrel having a diameter of 32 mm, and the active material layer surface was observed to check whether or not cracking or fracturing occurred. In a case where cracking or fracturing did not occur, the diameter of the mandrel (unit mm) was gradually reduced to 25, 20, 16, 12, 10, 8, 6, 5, 4, 3, and 2, and the diameter of the mandrel at which cracking or fracturing occurred was recorded. The evaluation standards are as follows. Rank C or higher is an acceptable level of the present test.

—Evaluation Standards—

A: the diameter of the mandrel was 5 mm or less

B: the diameter of the mandrel was 6 mm or 8 mm

C: the diameter of the mandrel was 10 mm

D: the diameter of the mandrel was 12 mm or 16 mm

E: the diameter of the mandrel was 20 mm or 25 mm

F: the diameter of the mandrel was 32 mm

TABLE 3

| Positive Electrode Sheet | Current Collector-Primer Layer Laminate | Positive Electrode Composition | Weight Per Unit Area mg/cm$^2$ | Thickness of Active Material Layer (μm) | Bct | Bct/Bcs | Peel Strength | Electrode Flexibility |
|---|---|---|---|---|---|---|---|---|
| CP-1 | P-1 | C-1 | 30 | 85 | 0.1 | ∞ | A | B |
| CP-2 | P-2 | C-1 | 30 | 86 | 0.3 | ∞ | A | B |
| CP-3 | P-3 | C-1 | 30 | 85 | 0.2 | ∞ | A | B |
| CP-4 | P-4 | C-1 | 30 | 86 | 1 | ∞ | A | A |
| CP-5 | P-5 | C-1 | 30 | 87 | 2 | ∞ | A | A |
| CP-6 | P-6 | C-6 | 30 | 82 | 25 | 1 | A | C |
| CP-7 | P-7 | C-7 | 30 | 83 | 10 | 1 | B | C |
| CP-8 | P-1 | C-2 | 30 | 86 | 0.2 | ∞ | A | B |
| CP-9 | P-1 | C-3 | 30 | 84 | 0.1 | ∞ | A | A |
| CP-10 | P-1 | C-4 | 30 | 84 | 0.2 | ∞ | A | A |
| CP-11 | P-1 | C-5 | 30 | 72 | 0.3 | ∞ | C | C |
| CP-12 | P-4 | C-8 | 30 | 88 | 2 | 2 | A | A |
| CP-13 | P-4 | C-8/C-9 | 30 | 88 | 2 | 5 | A | A |
| CP-14 | P-4 | C-8/C-10 | 30 | 87 | 2 | 10 | A | A |
| CCP-1 | P-11 | C-1 | 30 | 85 | 0.05 | ∞ | C | E |
| CCP-2 | P-11 | CC-1 | 30 | 86 | 0.05 | ∞ | D | E |
| CCP-3 | P-11 | CC-2 | 30 | 86 | 100 | 1 | E | E |
| CCP-4 | P-1 | CC-2 | 30 | 85 | 100 | 1 | E | E |

<Method of Calculating Bct, Bcs, Bct/Bcs (Bat, Bas, Bat/Bas)>

Regarding each of the positive electrode sheets (each of the negative electrode sheets), a cross-section was exposed using an ion milling device. The contents of the binder (A) and the binder particles (D) in a desired layer were determined by Raman mapping, and Bet, Bcs, Bct/Bcs (Bat, Bas, Bat/Bas) was calculated.

(Cross-Section Exposure Condition by Ion Milling Device)

Using an ion milling device (trade name: "IM4000PLUS", manufactured by Hitachi High-Technologies Corporation), the cross-section was exposed under a condition of acceleration voltage: 3 kV.

(Condition of Raman Mapping)

Cross-sections of five positions in a desired layer were exposed, and the respective contents of the binder (A) and the binder particles (D) were calculated from the total average value of cross-sectional areas of the binder (A) and the binder particles (D)s in the cross-sections. The total cross-sectional areas of the binder (A) and the binder particles (D) in the respective cross-sections were calculated from a spectrum derived from the binder (A) and a spectrum derived from the binder particles (D) by observation of the cross-sections using a microscopic Raman spectrometer (manufactured by JEOL Ltd.).

As can be seen from Table 3, in the positive electrode sheets CCP-1 to CCP-3 for an all-solid state secondary battery in which the binder (A) has a carbon-carbon unsaturated bond and a crosslinked structure is formed between the binder (A) and the inorganic solid electrolyte, the electrode flexibility was poor, and the peel strength was also poor. In addition, in a case where the positive electrode active material layer does not include binder particles, both the peel strength and the electrode flexibility were poor.

On the other hand, in the positive electrode sheet for an all-solid state secondary battery according to the embodiment of the present invention, the results of both the peel strength test and the electrode flexibility test were acceptable.

<Preparation of Negative Electrode Composition (A-1)>

180 zirconia beads having a diameter of 5 mm were put into a 45 mL container (manufactured by Fritsch Japan Co., Ltd.), and 2.8 g of the above-described synthesized Li—P—S-based glass, 0.2 g of (in terms of solid contents) of acrylic latex, and 12.3 g of heptane as a dispersion medium were put thereinto. The container was set in a planetary ball mill P-7 (manufactured by Fritsch Japan Co., Ltd.) and the components were mixed together for 2 hours at a temperature of 25° C. and a rotation speed of 300 rpm. Next, 7.0 g of CGB20 (trade name, manufactured by Nippon Kokuen Group) as an active material was put into the container. Next, using the same method, the container was set in a planetary ball mill P-7 (trade name, manufactured by Fritsch Japan Co., Ltd.) and the components were continuously mixed together for 15 minutes at a temperature of 25° C. and a rotation speed of 200 rpm. As a result, a negative electrode composition (A-1) was prepared.

Negative electrode compositions shown in Table 4 below other than the negative electrode composition (A-1) were prepared using the same method as that of the negative electrode composition (A-1), except that the composition was changed as shown in Table 4 below.

TABLE 4

| | Inorganic Solid Electrolyte | | Negative Electrode Active Material | | Conductive Auxiliary Agent | | Binder Particles | | | Other Binder Components | | Dispersion Medium | |
|---|---|---|---|---|---|---|---|---|---|---|---|---|---|
| Negative Electrode Composition | Kind | Addition Amount (g) | Kind | Addition Amount (g) | Kind | Addition Amount (g) | Kind | Average Particle Size (μm) | Addition Amount (g) | Kind | Addition Amount (g) | Kind | Addition Amount (g) |
| A-1 | Li—P—S | 2.8 | CGB20 | 7 | — | — | | 0.2 | 0.2 | — | — | Heptane | 12.3 |
| A-2 | Li—P—S | 2.8 | CGB20 | 7 | — | — | | 0.15 | 0.2 | — | — | Heptane | 12.3 |

TABLE 4-continued

| Negative Electrode Composition | Inorganic Solid Electrolyte Kind | Addition Amount (g) | Negative Electrode Active Material Kind | Addition Amount (g) | Conductive Auxiliary Agent Kind | Addition Amount (g) | Binder Particles Kind | Average Particle Size (μm) | Addition Amount (g) | Other Binder Components Kind | Addition Amount (g) | Dispersion Medium Kind | Addition Amount (g) |
|---|---|---|---|---|---|---|---|---|---|---|---|---|---|
| A-3 | Li—P—S | 4.8 | Si | 3.5 | AB | 1.5 | | 0.2 | 0.2 | — | — | Heptane | 20.3 |
| A-4 | LLZ | 2.8 | CGB20 | 7 | — | — | | 7 | 0.2 | — | — | Xylene | 12.3 |
| CA-1 | Li—P—S | 2.6 | CGB20 | 7 | — | — | UF-20S | 20 | 0.2 | — | — | Heptane | 15.0 |
| CA-2 | Li—P—S | 2.6 | CGB20 | 7 | — | — | — | — | — | SBR2 | 0.2 | Xylene | 12.3 |

<Note in Table 4>

Si: manufactured by Sigma-Aldrich Corporation, volume average particle size: 100 nm Other components: refer to the notes in Table 2

<Preparation of Negative Electrode Sheet AP-1 for All-Solid State Secondary Battery>

The negative electrode composition (A-1) prepared as described above was applied to the primer layer of the current collector-primer layer laminate (P-8) using an applicator (trade name: SA-201 Baker Type applicator, manufactured by Tester Sangyo Co., Ltd.), was heated at 80° C. for 1 hour, and was further dried at 110° C. for 1 hour. Next, the laminate was pressurized (20 MPa, 1 minute) while being heated (120° C.) using a heat press machine. As a result, a negative electrode sheet (AP-1) for an all-solid state secondary battery having a laminate structure of negative electrode active material layer/primer layer/stainless steel foil was prepared.

Negative electrode sheets shown in Table 5 below other than the negative electrode sheet (AP-1) were prepared using the same method as that of the negative electrode sheet (AP-1), except that the composition was changed as shown in Table 5 below. It was verified that, in the negative electrode sheets (AP-1) and (AP-4) to (AP-6), a crosslinked structure was not formed between the binder (A) and the inorganic solid electrolyte. On the other hand, in (CAP-1) to (CAP-3), a crosslinked structure was formed between the binder (A) and the inorganic solid electrolyte.

Using each of the prepared negative electrode sheets, a peel strength test and an electrode flexibility test were performed with the same method as described above. The results are shown in Table 5 below.

TABLE 5

| Negative Electrode Sheet | Current Collector-Primer Layer Laminate | Negative Electrode Composition | Weight Per Unit Area mg/cm$^2$ | Thickness of Active Material Layer (μm) | Bat | Bat/Bas | Peel Strength | Electrode Flexibility |
|---|---|---|---|---|---|---|---|---|
| AP-1 | P-8 | A-1 | 15 | 72 | 0.1 | >10 | A | A |
| AP-2 | P-9 | A-1 | 15 | 70 | 0.2 | >10 | A | A |
| AP-3 | P-10 | A-1 | 15 | 71 | 0.2 | >10 | A | A |
| AP-4 | P-8 | A-2 | 15 | 69 | 0.3 | >10 | A | A |
| AP-5 | P-8 | A-3 | 19 | 45 | 0.2 | >10 | A | A |
| AP-6 | P-8 | A-4 | 15 | 68 | 0.2 | >10 | C | C |
| CAP-1 | P-12 | A-1 | 15 | 70 | 0.05 | >10 | C | E |
| CAP-2 | P-12 | CA-1 | 15 | 73 | 0.05 | >10 | D | E |
| CAP-3 | P-12 | CA-2 | 15 | 71 | 100 | 1 | E | E |

As can be seen from Table 5, in the negative electrode sheets CAP-1 to CAP-3 for an all-solid state secondary battery in which the binder (A) has a carbon-carbon unsaturated bond and a crosslinked structure is formed between the binder (A) and the inorganic solid electrolyte, the electrode flexibility was poor, and the peel strength was also poor. In particular, in CAP-3 in which the negative electrode active material layer do not include binder particles, the result of the peel strength was significantly poor.

On the other hand, in the negative electrode sheet for an all-solid state secondary battery according to the embodiment of the present invention, the results of both the peel strength test and the electrode flexibility test were acceptable.

—Preparation of Solid Electrolyte Composition (E-1)—

180 zirconia beads having a diameter of 5 mm were put into a 45 mL container (manufactured by Fritsch Japan Co., Ltd.), and 10.0 g of the above-described synthesized Li—P—S-based glass, and 15.0 g of heptane as a dispersion medium were put thereinto. Next, the container was set in a planetary ball mill P-7 (trade name, manufactured by Fritsch Japan Co., Ltd.) and the components were continuously stirred for 2 hours at a temperature of 25° C. and a rotation speed of 300 rpm. As a result, a solid electrolyte composition (E-1) was prepared.

Solid electrolyte compositions shown in Table 6 below other than the solid electrolyte composition (E-1) were prepared using the same method as that of the solid electrolyte composition (E-1), except that the composition was changed as shown in Table 6 below.

TABLE 6

| | Inorganic Solid Electrolyte | | Binder Particles | | Dispersion Medium | |
|---|---|---|---|---|---|---|
| Solid Electrolyte Composition | Kind | Addition Amount (g) | Kind | Addition Amount (g) | Kind | Addition Amount (g) |
| E-1 | Li—P—S | 10 | — | — | Heptane | 15 |
| E-2 | Li—P—S | 9.7 | Acrylic Latex | 0.3 | Heptane | 15 |
| E-3 | Li—P—S | 9.8 | Urethane Latex | 0.2 | Heptane | 15 |
| E-4 | LLZ | 9.7 | PAN Particles | 0.3 | Heptane | 15 |

<Note in Table 6>

Refer to the notes in Table 2

<Method of Manufacturing All-Solid State Secondary Battery>

The bending test of the negative electrode sheet for an all-solid state secondary battery prepared as described above was performed using a mandrel having a diameter of 10 mm, the solid electrolyte composition (E-2) prepared as described above was applied to the negative electrode active material layer using an applicator, and the laminate was heated at 80° C. for 1 hour and was further dried at 110° C. for 6 hours. Next, the sheet in which the solid electrolyte layer was formed on the negative electrode active material layer was pressurized (30 MPa, 1 minute) while being heated (120° C.) using a heat press machine. As a result, a sheet having a laminate structure of solid electrolyte layer/negative electrode active material layer/primer layer/stainless steel foil was prepared.

This sheet was cut in a circular plate shape having a diameter of 15 mm. On the other hand, the bending test of the positive electrode sheet for an all-solid state secondary battery prepared as described above was performed using a mandrel having a diameter of 10 mm, and the sheet was cut in a circular plate shape having a diameter of 13 mm. The positive electrode active material layer and the solid electrolyte layer in the positive electrode sheet for an all-solid state secondary battery were disposed to face each other. Next, the sheet was pressurized (40 MPa, 1 minute) while being heated (120° C.) using a heat press machine. As a result, a laminate for an all-solid state secondary battery having a laminate structure of aluminum foil/primer layer/positive electrode active material layer/solid electrolyte layer/negative electrode active material layer/primer layer/stainless steel foil was prepared.

Figure 2:
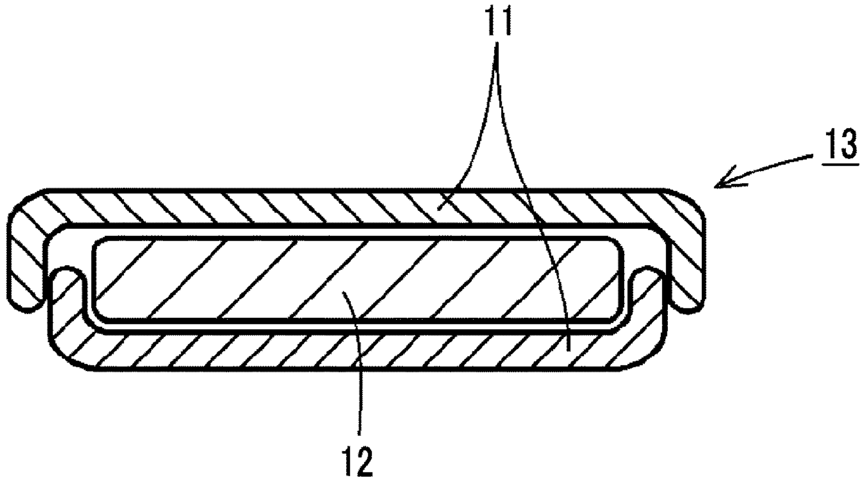
FIG. 2 is a vertical cross-sectional view schematically illustrating an all-solid state secondary battery prepared in an example.

The description will be made with reference to FIG. 2.

A laminate 12 for an all-solid state secondary battery prepared as described above was put into a 2032-type coin case 11 formed of stainless steel equipped with a spacer and a washer (not shown in FIG. 2), and the 2032-type coin case 11 was swaged. As a result, an all-solid state secondary battery 13 of No. 101 was prepared.

All-solid state secondary batteries shown in Table 7 below other than the all-solid state secondary battery of No. 101 were prepared using the same method as that of the all-solid state secondary battery of No. 101, except that the composition was changed as shown in Table 7 below.

<Measurement of Discharge Capacity Density>

The all-solid state secondary battery manufactured as described above was measured using a charging and discharging evaluation device "TOSCAT-3000" (trade name) (manufactured by Toyo System Corporation). The all-solid state secondary battery was charged at a current value of 0.2 mA until the battery voltage reached 4.2 V, and then was discharged at a current value of 0.2 mA until the battery voltage reached 3.0 V. This charging and discharging operation was set as one cycle. This cycle was repeated, and the discharge capacity of the third cycle was set as the discharge capacity of the all-solid state secondary battery. This discharge capacity was divided by the mass of the laminate for an all-solid state secondary battery to obtain the discharge capacity density.

A discharge capacity density of 25 Ah/kg or higher is an acceptable level of the present test.

<Evaluation of Resistance>

The all-solid state secondary battery manufactured as described above was measured using a charging and discharging evaluation device "TOSCAT-3000" (trade name) (manufactured by Toyo System Corporation). The all-solid state secondary battery was charged at a current value of 0.2 mA until the battery voltage reached 4.2 V, and then was discharged at a current value of 2.0 mA until the battery voltage reached 3.0 V. The battery voltage measured 10 seconds after the start of discharging was read based on the following standards, and the resistance was evaluated. As the battery voltage increases, the resistance decreases. The evaluation standards are as follows. Rank C or higher is an acceptable level of the present test.

—Evaluation Standards—

A: 4.1 V or higher

B: 4.0 V or higher and lower than 4.1 V

C: 3.8 V or higher and lower than 4.0 V

D: 3.6 V or higher and lower than 3.8 V

E: lower than 3.6 V

TABLE 7

| | Laminate | | | | | After Mandrel Test | |
|---|---|---|---|---|---|---|---|
| | | Solid Electrolyte Layer | | | | | |
| Test No. | Positive Electrode Sheet | Kind | Thickness μm | Negative Electrode Sheet | Discharge Capacity Ah/kg | Resistance |
| 101 | CP-1 | E-2 | 25 | AP-1 | 41 | B |
| 102 | CP-2 | E-2 | 30 | AP-2 | 43 | B |
| 103 | CP-3 | E-2 | 29 | AP-3 | 41 | B |
| 104 | CP-4 | E-3 | 27 | AP-4 | 45 | B |
| 105 | CP-5 | E-3 | 26 | AP-5 | 50 | B |
| 106 | CP-6 | E-3 | 28 | AP-1 | 36 | C |
| 107 | CP-7 | E-3 | 28 | AP-2 | 37 | C |
| 108 | CP-8 | E-2 | 26 | AP-3 | 53 | B |
| 109 | CP-9 | E-2 | 27 | AP-4 | 49 | A |
| 110 | CP-10 | E-3 | 30 | AP-5 | 50 | A |

TABLE 7-continued

| | Laminate | | | | After Mandrel Test | |
|---|---|---|---|---|---|---|
| | Positive | Solid Electrolyte Layer | | Negative | Discharge | |
| Test No. | Electrode Sheet | Kind | Thickness μm | Electrode Sheet | Capacity Ah/kg | Resistance |
| 111 | CP-11 | E-4 | 100 | AP-6 | 26 | C |
| 112 | CP-9 | E-2 | 27 | CAP-1 | 41 | C |
| 113 | CP-12 | E-3 | 27 | AP-4 | 29 | C |
| 114 | CP-13 | E-3 | 28 | AP-4 | 34 | C |
| 115 | CP-14 | E-3 | 28 | AP-4 | 40 | B |
| c01 | CCP-1 | E-1 | 30 | CAP-1 | 17 | E |
| c02 | CCP-2 | E-1 | 30 | CAP-2 | 17 | E |
| c03 | CCP-3 | E-1 | 28 | CAP-3 | 18 | E |
| c04 | CCP-4 | E-1 | 29 | CAP-3 | 17 | E |

As can be seen from Table 7, in the all-solid state secondary batteries C01 to C04 not satisfying the regulations of the present invention, the results of both a discharge capacity test and a resistance test were unacceptable although the solid electrolyte layer does not include the binder (does not include the binder that adversely affects lithium conduction).

On the other hand, in the all-solid state secondary battery according to the embodiment of the present invention, the results of the discharge capacity test and the resistance test were acceptable.

The present invention has been described using the embodiments. However, unless specified otherwise, any of the details of the above description is not intended to limit the present invention and can be construed in a broad sense within a range not departing from the concept and scope of the present invention disclosed in the accompanying claims.

EXPLANATION OF REFERENCES

1: negative electrode current collector
2: negative electrode active material layer
3: solid electrolyte layer
4: positive electrode active material layer
5: positive electrode current collector
6: operation portion
10: all-solid state secondary battery
11: 2032-type coin case
12: laminate for all-solid state secondary battery
13: all-solid state secondary battery

What is claimed is:

1. An electrode sheet for an all-solid state secondary battery, the electrode sheet comprising a current collector, a primer layer, and an electrode active material layer in this order, wherein the primer layer includes a binder (A1), the electrode active material layer includes an inorganic solid electrolyte (B) having ion conductivity of a metal belonging to Group 1 or Group 2 in the periodic table, an active material (C), and binder particles (D) having an average particle size of 1 nm to 10 μm and further includes a binder (A2) on at least an adhesive interface side with the primer layer, the binder (A1) and the binder (A2) are made of a same material, and a crosslinked structure is not formed between the binder (A2) and the inorganic solid electrolyte (B), wherein a Bet mass % is a ratio of a content of the binder (A2) in an electrode active material layer ET to a total content of the binder (A2) and the binder particles (D) in the electrode active material layer ET, a Bes mass % is a ratio of a content of the binder (A2) in an electrode active material layer ES to a total content of the binder (A2) and the binder particles (D) in the electrode active material layer ES, and (Bet mass %/Bes mass %)>1, wherein the electrode active material layer is equally divided into ten sub layers in a thickness direction and the ten sub layers are represented by a to j layers, respectively, in order from a sub layer in contact with the primer layer, the electrode active material layer ET represents the a layer and the electrode active material layer ES represents a layer including the b to j layers.

2. The electrode sheet for an all-solid state secondary battery according to claim 1, wherein a content of the binder (A2) decreases from a side of the electrode active material layer facing the current collector toward a side of the electrode active material layer opposite to the current collector.

3. The electrode sheet for an all-solid state secondary battery according to claim 1, wherein a Log P value of a dispersion medium that disperses the binder particles (D) and a Log P value of a solvent that dissolves the binder (A2) are 0.5 or higher.

4. The electrode sheet for an all-solid state secondary battery according to claim 1, wherein the binder particles (D) are polyamide particles, polyimide particles, polyurea particles, fluorine-containing resin particles, hydrocarbon resin particles, urethane resin particles, or acrylic resin particles.

5. The electrode sheet for an all-solid state secondary battery according to claim 1, wherein a compound forming the binder (A1) and the binder (A2) is different from a compound forming the binder particles (D).

6. The electrode sheet for an all-solid state secondary battery according to claim 1, wherein the binder (A1) and the binder (A2) are respectively a hydrocarbon resin.

7. The electrode sheet for an all-solid state secondary battery according to claim 1, wherein the binder particles (D) have at least one in the following group of functional groups, <Group of Functional Groups> an acidic functional group, a basic functional group, a hydroxy group, a cyano group, an alkoxysilyl group, an aryl group, a heteroaryl group, and a hydrocarbon ring group in which three or more rings are fused.

8. The electrode sheet for an all-solid state secondary battery according to claim 1, wherein the inorganic solid electrolyte (B) is a sulfide-based inorganic solid electrolyte.

9. The electrode sheet for an all-solid state secondary battery according to claim 1, wherein the electrode active material layer is peeled off from the current collector, a peel strength is 60 N/m or higher.

10. An all-solid state secondary battery comprising:

the electrode sheet for an all-solid state secondary battery according to claim 1.

11. A method of manufacturing the electrode sheet for an all-solid state secondary battery according to claim 1, the method comprising:

a step of forming the primer layer on the current collector and forming the electrode active material layer on the primer layer, wherein by transferring a part of the binder (A1) in the primer layer to the electrode active material layer in the step, the electrode active material layer includes the binder (A2) on at least an adhesive interface side with the primer layer.

12. A method of manufacturing an all-solid state secondary battery, the method comprising:

obtaining an electrode sheet for an all-solid state secondary battery using the method according to claim 11 and manufacturing an all-solid state secondary battery using the electrode sheet for an all-solid state secondary battery.

* * * * *